US011920380B1

(12) United States Patent
Flannery et al.

(10) Patent No.: US 11,920,380 B1
(45) **Date of Patent: *Mar. 5, 2024**

(54) LATCH APPARATUS WITH INDEPENDENT IDENTICAL OPPOSING LATCHES

(71) Applicant: Carlson Pet Products, Inc., Longboat Key, FL (US)

(72) Inventors: Mark A. Flannery, Longboat Key, FL (US); Brian M. McMahon, Palatine, IL (US); Caleb Summers, Saint Louis Park, MN (US); Brian G. Linehan, Saint Paul, MN (US)

(73) Assignee: Carlson Pet Products, Inc., Longboat Key, FL (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/083,563

(22) Filed: Dec. 18, 2022

Related U.S. Application Data

(63) Continuation of application No. 17/013,638, filed on Sep. 6, 2020, now Pat. No. 11,530,553, which is a (Continued)

(51) Int. Cl.
*E05B 65/00* (2006.01)
*E05B 15/02* (2006.01)
(Continued)

(52) U.S. Cl.
CPC ........ *E05B 65/0007* (2013.01); *E05B 15/022* (2013.01); *E05B 17/2057* (2013.01); (Continued)

(58) Field of Classification Search
CPC ............... E05B 65/0007; E05B 15/022; E05B 17/2069; E05B 15/0205; E06B 7/32; (Continued)

(56) References Cited

U.S. PATENT DOCUMENTS 4,688,834 A 8/1987 Nakayama
5,127,684 A * 7/1992 Klotz ...................... E05C 19/14 292/DIG. 53
(Continued)

FOREIGN PATENT DOCUMENTS

FR 2877980 A1 5/2006
GB 2062742 A 5/1981
(Continued)

*Primary Examiner* — Marcus Menezes

(57) ABSTRACT

The present latch apparatus includes a swinging piece having first and second independent latches or sliders sliding in first and second slots. The first and second sliders slide independently of each other. The first and second sliders engage an undersurface of an extension of a first object such as a gate. If either the first or second slider is engaged on the undersurface, the swinging piece is locked and is not swingable such that the first object such as the gate cannot itself swing away from a second object such as a barrier section. Only when each of the first and second sliders has been slid beyond the undersurface can the swinging piece swing to permit the first object such as the gate to be released and thus swingable itself relative to the second object such as the barrier section.

2 Claims, 16 Drawing Sheets

Related U.S. Application Data continuation of application No. 16/171,318, filed on Oct. 25, 2018, now Pat. No. 10,767,393, which is a continuation of application No. 15/632,332, filed on Jun. 24, 2017, now Pat. No. 10,113,335, which is a continuation of application No. 15/055,575, filed on Feb. 27, 2016, now Pat. No. 9,689,197.

(60) Provisional application No. 62/126,719, filed on Mar. 2, 2015.

(51) Int. Cl.

| | |
|---|---|
| ***E05B 17/20*** | (2006.01) |
| ***E06B 7/32*** | (2006.01) |
| ***E06B 9/02*** | (2006.01) |
| ***E06B 9/04*** | (2006.01) |
| ***E06B 11/02*** | (2006.01) |
| *E05C 3/04* | (2006.01) |
| *E06B 9/00* | (2006.01) |

(52) U.S. Cl.

CPC ............ *E05B 17/2069* (2013.01); *E06B 7/32* (2013.01); *E06B 9/02* (2013.01); *E06B 9/04* (2013.01); *E06B 11/02* (2013.01); *E05B 15/0205* (2013.01); *E05C 3/04* (2013.01); *E06B 2009/002* (2013.01); *Y10S 292/63* (2013.01)

(58) Field of Classification Search

CPC ... E06B 9/02; E06B 9/04; E06B 11/02; E06B 2009/002

See application file for complete search history.

(56) References Cited

U.S. PATENT DOCUMENTS

| | | | | | |
|---|---|---|---|---|---|
| 5,396,732 | A | | 3/1995 | Andersen | |
| 6,003,908 | A | | 12/1999 | King | |
| 6,056,038 | A | | 5/2000 | Foster | |
| 6,139,213 | A | * | 10/2000 | Osborne | F16B 5/0614 403/338 |
| 6,321,685 | B1 | * | 11/2001 | Fountain | A01K 31/02 292/238 |
| 7,887,029 | B2 | | 2/2011 | Flannery | |
| 7,950,184 | B2 | | 5/2011 | Flannery | |
| 7,975,431 | B2 | | 7/2011 | Flannery | |
| 8,113,551 | B2 | | 2/2012 | Baic | |
| 8,448,381 | B2 | | 5/2013 | Flannery | |
| 8,544,149 | B1 | | 10/2013 | Faber | |
| 9,151,080 | B2 | | 10/2015 | Saunders | |
| 9,388,603 | B2 | | 7/2016 | Flannery | |
| 9,394,726 | B1 | | 7/2016 | Flannery | |
| 9,415,876 | B1 | | 8/2016 | Baic | |
| 9,458,668 | B1 | | 10/2016 | Flannery | |
| 9,464,467 | B1 | | 10/2016 | Flannery | |
| 9,689,197 | B1 | | 6/2017 | Flannery | |
| 10,435,929 | B2 | | 10/2019 | Do | |
| 2003/0009945 | A1 | | 1/2003 | Cheng | |
| 2005/0028947 | A1 | | 2/2005 | Waldman | |
| 2006/0249958 | A1 | | 11/2006 | Ruckert | |
| 2008/0284180 | A1 | | 11/2008 | Newcombe | |
| 2009/0108591 | A1 | | 4/2009 | De Vries | |
| 2012/0211999 | A1 | | 8/2012 | VanHellemont | |
| 2012/0242097 | A1 | | 9/2012 | Hernandez | |
| 2013/0118088 | A1 | | 5/2013 | Yates | |
| 2019/0078353 | A1 | | 3/2019 | Gentil | |
| 2019/0153747 | A1 | | 5/2019 | Ward | |

FOREIGN PATENT DOCUMENTS

| | | | | | |
|---|---|---|---|---|---|
| GB | 2271144 | A | * | 4/1994 | E05B 63/20 |
| GB | 2271144 | A | | 4/1994 | |
| GB | 2271603 | A | * | 4/1994 | E05B 17/2019 |
| GB | 2271603 | A | | 4/1994 | |

* cited by examiner

LATCH APPARATUS WITH INDEPENDENT IDENTICAL OPPOSING LATCHES

This application is a continuation of U.S. patent application Ser. No. 17/013,638 filed Sep. 6, 2020 (U.S. Pat. No. 11,530,553 issued Dec. 20, 2022) and claims the benefit thereof under 35 U.S.C. § 120, which application is a continuation of U.S. patent application Ser. No. 16/171,318 filed Oct. 25, 2018 (U.S. Pat. No. 10,767,393 issued Sep. 8, 2020) and claims the benefit thereof under 35 U.S.C. § 120, which application is a continuation of U.S. patent application Ser. No. 15/632,332 filed Jun. 24, 2017 (U.S. Pat. No. 10,113,335 issued Oct. 30, 2018) and claims the benefit thereof under 35 U.S.C. § 120, which application is a continuation of U.S. patent application Ser. No. 15/055,575 filed Feb. 27, 2016 (U.S. Pat. No. 9,689,197 issued Jun. 27, 2017) and claims the benefit thereof under 35 U.S.C. § 120, which application claims the benefit under 35 U.S.C. § 119(e) of U.S. Provisional Patent Application No. 62/126,719 filed Mar. 2, 2015, all of which applications are hereby incorporated by reference in their entireties into this application.

FIELD OF THE INVENTION

The present invention relates generally to a gated barrier, particularly to a latch apparatus for a gate in the gated barrier, and specifically to such a latch apparatus having a swinging piece that remains locked until first and second sliders are independently slid beyond an engaging undersurface.

BACKGROUND OF THE INVENTION

A toddler is curious. Curiosity can solve problems. One problem a toddler may encounter is a gated barrier intended to keep him or her out of the kitchen or at the top of a staircase.

A toddler can stand but, by definition, is not so tall. It may be difficult for the toddler to see both sides of a gated barrier. It may be difficult for the toddler to reach by hand or access both sides of the gated barrier at the same time.

All toddlers are ambidextrous. However, a toddler does not have a third hand or a fourth hand.

A toddler has all of the time in the world. He or she can be patient.

A toddler is observant.

A toddler is a copyist. He or she can copy what he or she observes.

An adult rushes. He or she has little time.

An adult has a relatively large hand that is strong.

An adult can use his or her thumb and first finger of one hand well in combination.

SUMMARY OF THE INVENTION

A feature of the present invention is a gated barrier having a gate, a barrier section, and a latch apparatus.

Another feature of the present invention is a latch apparatus.

Another feature of the present invention is the provision in a latch apparatus between a gate and a barrier section of a gated barrier, of an extension, the extension extending in a length direction from one of the gate and first barrier section toward the other of the gate and first barrier section.

Another feature of the present invention is the provision in a latch apparatus between a gate and a barrier section of a gated barrier, of the extension including a first under slide face, the first under slide face having a first proximal under slide end and a first distal under slide end, the first under slide face defining a first under slide direction.

Another feature of the present invention is the provision in a latch apparatus between a gate and a barrier section of a gated barrier, of a swinging piece, the swinging piece pivotally engaged to one of the gate and first barrier section, the swinging piece releasably engaged to the other of the gate and first barrier section to permit the gate to be opened relative to the first barrier section, the swinging piece having an open position where the swinging piece is disengaged from said other of the gate and first barrier, the swinging piece having a closed position where the swinging piece is engaged to said other of the gate and first barrier.

Another feature of the present invention is the provision in a latch apparatus between a gate and a barrier section of a gated barrier, of the swinging piece including a first slot, the first slot having a first proximal slot end and a first distal slot end, the first proximal slot end being adjacent to the first proximal under slide end when the swinging piece is in the closed position, the first distal slot end being adjacent to the first distal under slide end when the swinging piece is in the closed position.

Another feature of the present invention is the provision in a latch apparatus between a gate and a barrier section of a gated barrier, of the swinging piece including a first slider, the first slider engaged in the first slot, the first slider slidingly engaging from below the first under slide face, the first slider preventing the swinging piece from pivoting when the first slider is engaged by the first under slide face, the first slider being slideable beyond the first under distal slide end to permit the swinging piece to pivot and disengage from said other of the gate and first barrier section.

Another feature of the present invention is the provision in a latch apparatus between a gate and a barrier section of a gated barrier, of the extension including a second under slide face, the second under slide face having a second proximal under slide end and a second distal under slide end, the second under slide face defining a second under slide direction.

Another feature of the present invention is the provision in a latch apparatus between a gate and a barrier section of a gated barrier, of the swinging piece including a second slot, the second slot having a second proximal slot end and a second distal slot end, the second proximal slot end being adjacent to the second proximal under slide end when the swinging piece is in the closed position, the second distal slot end being adjacent to the second distal under slide end when the swinging piece is in the closed position.

Another feature of the present invention is the provision in a latch apparatus between a gate and a barrier section of a gated barrier, of the swinging piece including a second slider, the second slider engaged in the second slot, the second slider slidingly engaging from below the second under slide face, the second slider preventing the swinging piece from pivoting when the second slider is engaged by the second under slide face, the second slider being slideable beyond the second distal under slide end to permit the swinging piece to pivot and disengage from said other of the gate and first barrier section.

Another feature of the present invention is the provision in a latch apparatus between a gate and a barrier section of a gated barrier, of the swinging piece being locked in the closed position until each of the first and second sliders has been slid beyond the first and second distal under slide ends, whereupon the swinging piece may be swung to the open position.

Another feature of the present invention is the provision in a latch apparatus between a gate and a barrier section of a gated barrier, of the first under slide face running in the length and height direction such that the first under slide face is oblique to a horizontal direction and such that the first proximal under slide end has a lower elevation than the first distal under slide end.

Another feature of the present invention is the provision in a latch apparatus between a gate and a barrier section of a gated barrier, of the first slot running in the length and height direction such that the first slot is oblique to a horizontal direction and such that the first proximal slot end has a lower elevation than the first distal slot end.

Another feature of the present invention is the provision in a latch apparatus between a gate and a barrier section of a gated barrier, of the extension including a first over slide face, the first over slide face having a first proximal over slide end and a first distal over slide end, the first over slide face defining a first over slide direction, the first slider sliding on the first over slide face when the swing piece pivots from the open position to the closed position, the first slider sliding from the first over slide face to the first under slide face when the swing piece pivots from the open position to the closed position.

Another feature of the present invention is the provision in a latch apparatus between a gate and a barrier section of a gated barrier, of the first proximal over slide end being spaced apart from the first proximal under slide end, and of the first distal over slide end being adjacent to the first distal under slide end.

Another feature of the present invention is the provision in a latch apparatus between a gate and a barrier section of a gated barrier, of the first under slide direction and the first over slide direction running transversely to each other.

Another feature of the present invention is the provision in a latch apparatus between a gate and a barrier section of a gated barrier, of the first slider being spinnable in the first slot.

Another feature of the present invention is the provision in a latch apparatus between a gate and a barrier section of a gated barrier, of the first slider including an outer head and an inner head, the outer head being accessible by a finger, the inner head slideable on the first slide face.

Another feature of the present invention is the provision in a latch apparatus between a gate and a barrier section of a gated barrier, of the first slider including an outer head, an inner head and a shaft between the outer and inner head, the shaft having a diameter about the same as or slightly smaller than a width of the first slot to minimize play by the first slider in the first slot.

Another feature of the present invention is the provision in a latch apparatus between a gate and a barrier section of a gated barrier, of the first slider including an outer head and an inner head, where the first slot has a thickness, and where a distance between the outer head and the inner head is about the same as or slightly greater than the thickness of the first slot to minimize play by the first slider in the first slot.

Another feature of the present invention is the provision in a latch apparatus between a gate and a barrier section of a gated barrier, of the swinging piece including a U-shaped frame, the extension being receivable in the U-shaped frame.

Another feature of the present invention is the provision in a latch apparatus between a gate and a barrier section of a gated barrier, of the swinging piece including a U-shaped frame, wherein the gate comprises a gate frame, and wherein a portion of the gate frame is receivable in the U-shaped frame when the swinging piece is in the closed position to prevent swinging of the gate relative to the barrier section.

Another feature of the present invention is the provision in a latch apparatus between a gate and a barrier section of a gated barrier, of the swinging piece including a U-shaped frame, where the barrier section includes a barrier section frame, and where a portion of the barrier section frame is receivable in the U-shaped frame when the swinging piece is in the closed position to prevent swinging of the gate relative to the barrier section.

Another feature of the present invention is the provision in a latch apparatus between a gate and a barrier section of a gated barrier, of the first and second sliders being coaxial when the swinging piece is in the closed position.

Another feature of the present invention is the provision in a latch apparatus between a gate and a barrier section of a gated barrier, of the swinging piece including a first plate portion having the first slot, where the swinging piece includes a second plate portion having said second slot, and where the first and second plate portions oppose each other in the width direction.

Another feature of the present invention is the provision in a latch apparatus between a gate and a barrier section of a gated barrier, of the swinging piece having an open stopped position and a closed stop position, the swinging piece being stopped from further pivoting in a first direction at the open stopped position, the swinging piece being stopped from further pivoting in a second direction at the closed stopped position, the first proximal slot end having a lower elevation than the first distal slot end when the swinging piece is in the open stopped position and when the swinging piece is in the closed stopped position such that the first slide can slide by gravity from the first distal slot end to the second distal slot end when the swinging piece is at any position between the open stopped position and the closed stopped position.

Another feature of the present invention is the provision in a latch apparatus between a gate and a barrier section of a gated barrier, of the gate including an uppermost frame member, the swinging piece engaging the uppermost frame member.

Another feature of the present invention is the provision in a latch apparatus between a gate and a barrier section of a gated barrier, of the extension being received by the swinging piece when the swinging piece is in the closed position, and where from a side plan view the extension is hidden by the swinging piece when the swinging piece is in the closed position.

Another feature of the present invention is the provision in a latch apparatus between a first object and a second object, of the first object being swingable relative to the second object when the latch apparatus is opened.

Another feature of the present invention is the provision in a latch apparatus between a first object and a second object, where the first object is a gate in a gated barrier and the second object is a barrier section of the gated barrier.

An advantage of the present invention is that the chances of a toddler opening the latch apparatus are minimized, for any number of reasons.

A first reason is that the two independently operated sliders must simultaneously be beyond the distal end of the undersurface slide for the swinging piece to swing up and out of engagement with the barrier section. It may be difficult for the toddler to figure such out.

A second reason is that at least six actions are required to open a gate in a barrier where the gate has the present latch apparatus. First, one of the sliders must be slid to the distal end of its respective slot. Second, such slider must be held in such distal end. Third, the other of the sliders must be slid to the distal end of its respective slot. Fourth, such slider must be held in such distal end. Fifth, while holding the sliders in their respective distal ends, a swinging piece having the sliders must be swung upwardly. Sixth, while the swinging piece is held in an open position, the gate must be swung open. Such six steps may be difficult for a toddler.

A third reason is that the sliders that must be operated are on opposing faces of the gate. One slider is on the front of the gate. The other slider is on the back of the gate. It may be difficult for the toddler to reach to the back of the gate.

A fourth reason is that the mechanics of the latch apparatus are hidden. The latch apparatus includes a U-shaped housing having plate sections on either side of the housing. The extension having the undersurface on which the sliders slide is hidden from view by the plate sections.

A fifth reason is that the latch apparatus is on an uppermost portion of the frame of the gate, perhaps too high for a toddler to reach. Compounding this height problem is the issue that the swinging piece must be swung upwardly to even a greater height.

Another advantage of the present invention is that an adult may open the latch apparatus quickly and easily with one hand. For example, the hand of an adult is easily of sufficient size to draw up the first and second sliders with the thumb and first finger and, with the same action, raise the swinging piece to disengage the gate from the barrier section. Then, while still holding on to the swinging piece with one hand, the adult can swing open the gate with the same hand.

Another advantage of the present invention is that the latch apparatus may be quickly and easily closed with one hand. The gate can be swung from an open position to be aligned with the barrier section with the swinging piece in the open position. Then, with the sliders in any position, the swinging piece can be let down or dropped down, whereupon the sliders automatically slide by gravity down the upper face of the extension and then automatically slide by gravity adjacent to the under face of the extension to return to the proximal ends of their respective slots.

Another advantage of the present invention is that the latch apparatus has a minimal number of parts.

Another advantage of the present invention is that the mechanics of the latch apparatus are simple.

Another advantage of the present invention is that the latch apparatus is inexpensive to manufacture.

Another advantage of the present invention is that the latch apparatus is easy to manufacture.

DESCRIPTION

Figure 1:
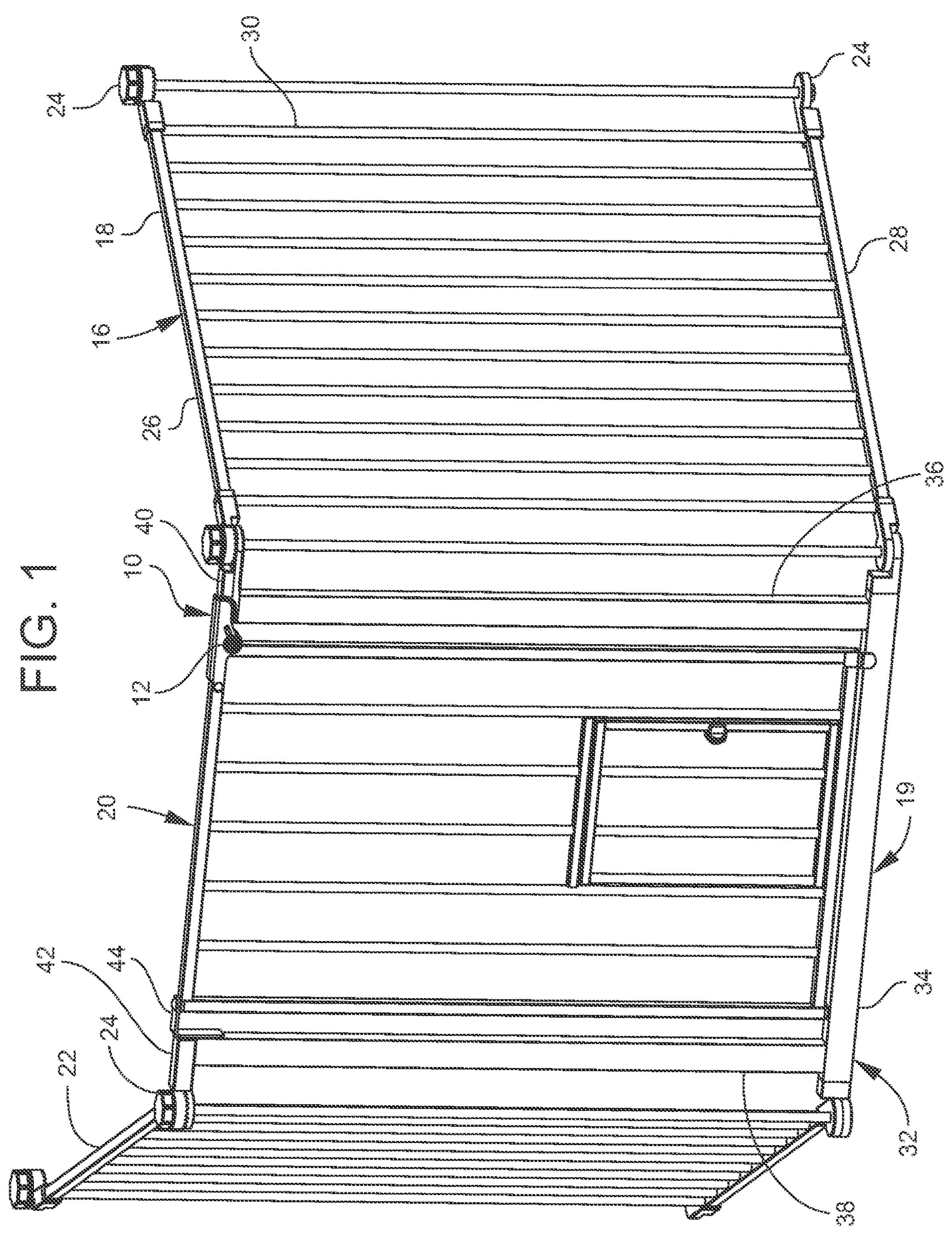
FIG. 1 is a perspective view of a gated barrier having the present latch apparatus with independent identical opposing latches, shows the gate in a closed position, and shows the latch apparatus in a closed position.
Figure 4:
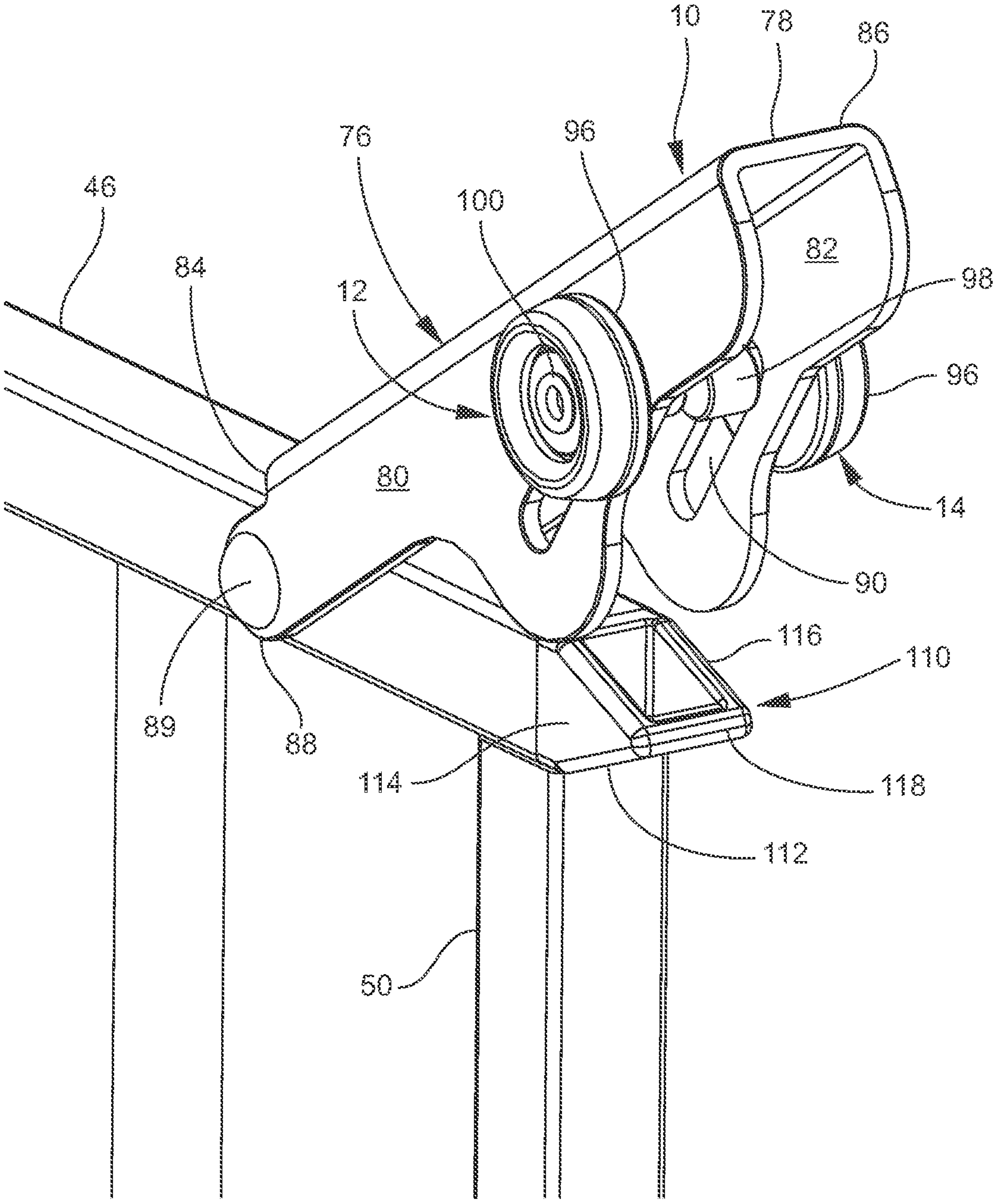
FIG. 4 is a perspective detail view of the latch apparatus of FIG. 1 in an open position.
Figure 5:
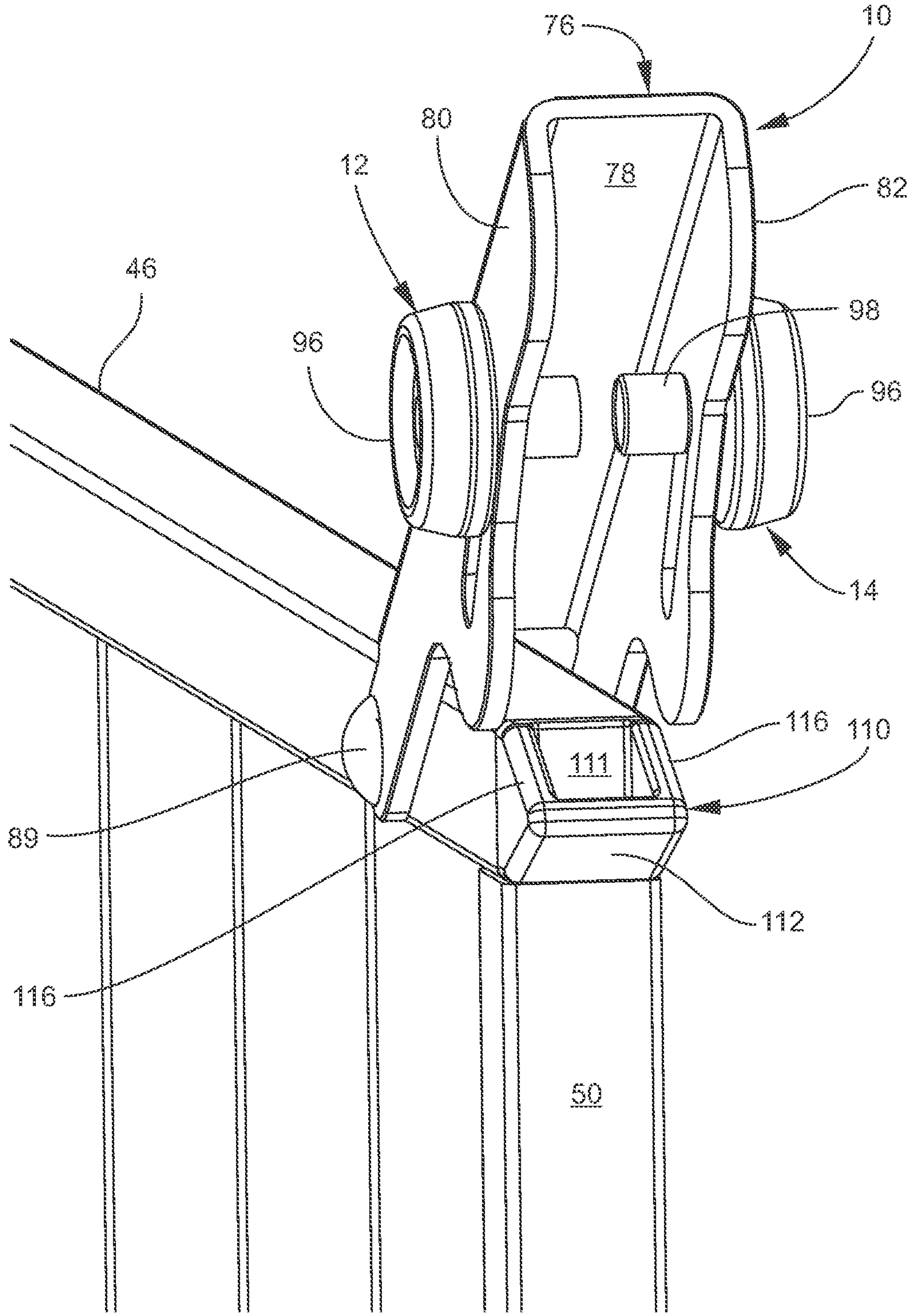
FIG. 5 is a perspective detail view of the latch apparatus of FIG. 1 in an open position.

As shown in FIGS. 1, 4 and 5, reference number 10 indicates the present latch apparatus 10 with independent, identical, and opposing latches or sliders 12, 14.

As shown in FIG. 1, latch apparatus 10 is engaged in a barrier 16. Barrier 16 includes a first barrier section 18, a second barrier section 19, a gate 20 in the second barrier section 19, and a third barrier section 22. Barrier 16 further includes junctions 24 that interconnect a) the first barrier section 18 to the second barrier section 19, b) the second barrier section 19 to the third barrier section 22, c) the first barrier section 18 to a further barrier section, and d) the third barrier section 22 to a further barrier section. As to barrier 16 including first barrier section 18, second barrier section 19, gate 20, third barrier section 22, and junction 24, the Flannery U.S. Pat. No. 7,887,029 B2 issued Feb. 15, 2011 and entitled In-House Gated Safety Barrier Having Customizable Layout is hereby incorporated by reference in its entirety.

Each of barrier sections 18, 22 includes an upper or uppermost straight horizontal support member 26, a lower or lowermost straight horizontal support member 28, and a set of straight vertical support members 30. The straight vertical support members 30 run to and between the upper and lower straight horizontal members 26, 28.

Second barrier section 19 includes a generally U-shaped open top frame 32 defined by a lower or lowermost straight horizontal support member 34, a first straight vertical support member 36 or standard 36, and a second straight vertical support member 38 or standard 38. Second barrier section 19 further includes a first relatively short upper or uppermost straight horizontal support member and a second relatively short upper or uppermost straight horizontal support member 42. Support member 40 is engaged to the top of vertical standard 36 and extends outwardly therefrom to an adjacent junction 24. Support member 42 is engaged to the top of vertical standard 38 and extends outwardly therefrom to an adjacent junction 24. An L-shaped bracket 44 extend from support member 42 and vertical standard 38 to the swinging end of the gate 20.

Figure 2:
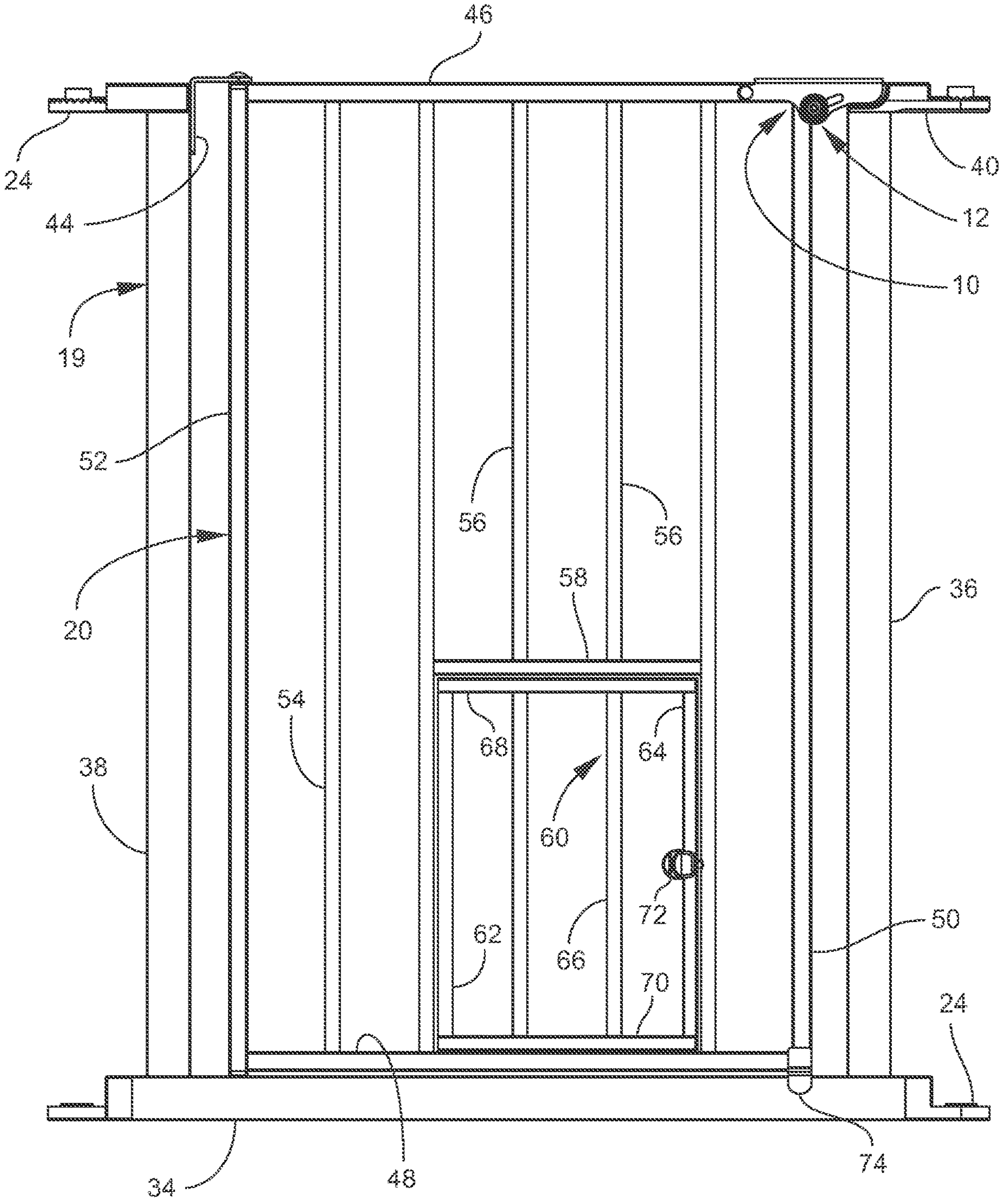
FIG. 2 is a front elevation view of the gate of the gated barrier of FIG. 1, shows the gate in a closed position, and shows the latch apparatus of FIG. 1 in a closed position.

As shown in FIGS. 1 and 2, gate 20 includes an upper or uppermost straight horizontal support member 46 and a lower or lowermost straight horizontal support member 48. Gate 20 further includes a first straight end vertical support member 50 and a second straight end vertical support member 52. Support member 50 extends between lower support member 48 and upper support member 46. Support member 52 defines a swing axis for gate 20 and is engaged between lower support member 34 of barrier section 19 and an end of the L-shaped bracket 44. Support member 48 is engaged between support members 50, 52. Support member 46 is engaged between support members 50, 52. Gate 20 further includes a set of three inner straight vertical support members 54 extending to and between upper and lower horizontal support members 46, 48.

Gate 20 further includes a set of two relatively short straight vertical support members 56. Vertical support members 56 are engaged to and between horizontal support member 46 and a relatively short intermediate straight horizontal support member 58. Intermediate horizontal support member 58 is engaged to and between two vertical support members 54.

Gate 20 further includes a pet door 60 that swings open to either side of gate 20. Pet door 60 is framed by horizontal support member 58, portions of two vertical support members 54, and bottommost support member 48. Pet door 60 includes an outer or end vertical straight support member 62 that defines a swing axis for the pet door 60 and that defines one end of the pet door 60. Pet door 60 includes an end vertical straight support member 64 that defines the other end of the pet door 60. Pet door 60 further includes two intermediate straight vertical support members 66. Vertical support members 62, 64 and 66 are engaged to and run between uppermost and lowermost straight horizontal support members 70. Pet door 60 includes a latch 72 that extends between end vertical support member 64 and the vertical support member 54 that is adjacent to end vertical support member 50. Latch 72 has a spring biased pin that engages an opening in the vertical support member 54 that is adjacent to end vertical support member 50. Pet door 60 further includes upper and lower pins that are coaxial with support member 62 and that are coaxial with and define the swing axis for pet door 60. Such upper pin extends between an end of horizontal support member 68 and an end of horizontal support member 58. Such lower pin extends between an end of horizontal support member 70 and lowermost support member 48. Pet door 60 includes a rectangular outer frame that includes upper horizontal support member 68, vertical support member 64, lower horizontal support member 70, and vertical support member 62.

Figure 3B:
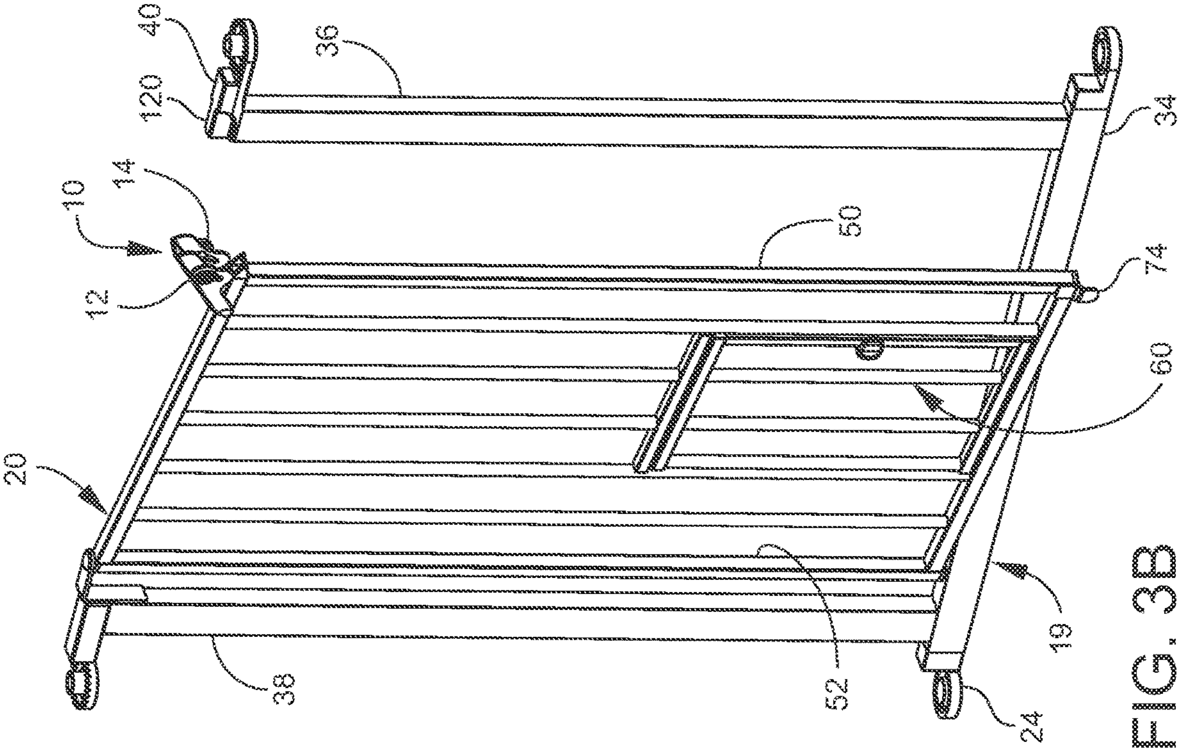
FIG. 3B is a perspective view of the gate and latch apparatus of FIG. 3A, shows the gate in an open position, and shows the latch apparatus in an open position.
Figure 3A:
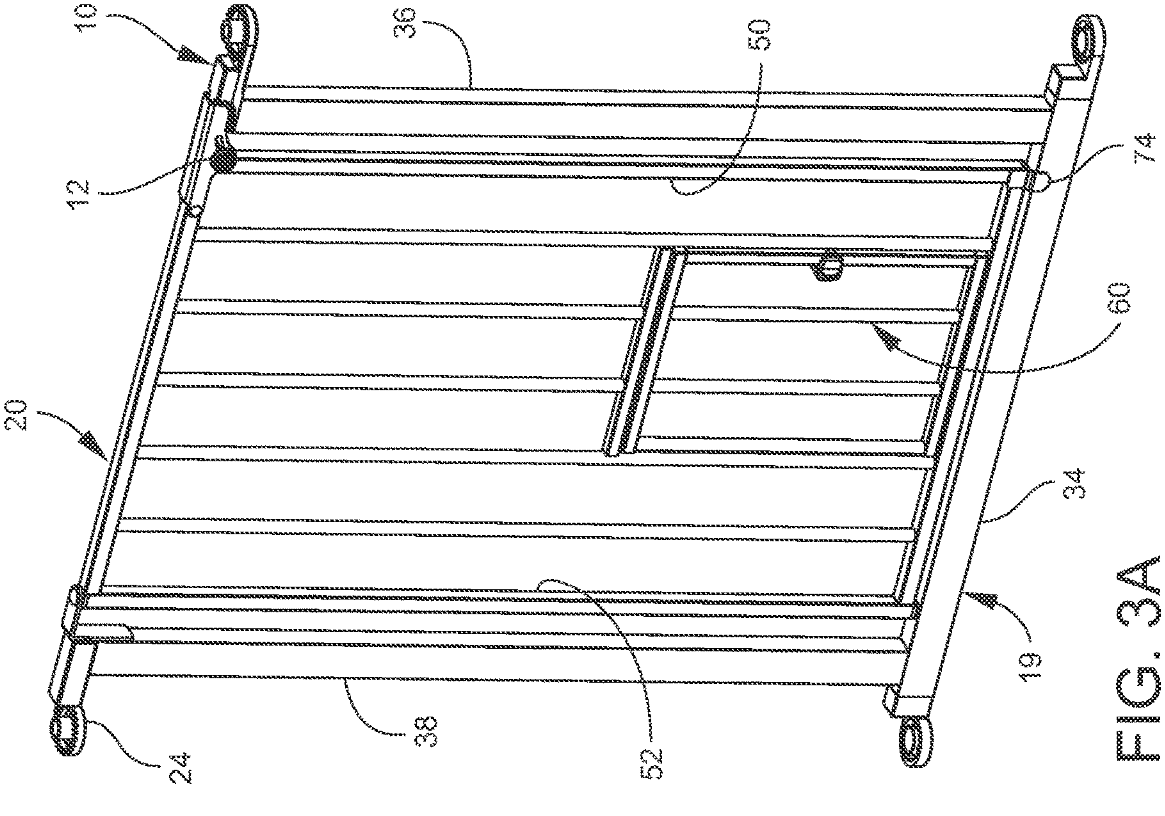
FIG. 3A is a perspective view of the gate and latch apparatus of FIG. 2, shows the gate in a closed position, and shows the latch apparatus in a closed position.

As shown in FIGS. 2, 3A, and 3B, gate 20 further preferably includes a stop 74 that is engaged to portions of vertical support member 50 and horizontal support member 48 at the junction between members 48, 50. Stop 74 extends downwardly from such junction to confront a vertical face of bottommost horizontal support member 34 such that gate 20 is swingable only one way and does not swing through barrier section 19. Gate 20 is stopped by stop 74 in the plane of the barrier section 19. Barrier section 19 and gate 20 lie in a common plane when latch apparatus 10 is closed.

As shown in FIGS. 4, 5, 15A, 15B, and 16A, latch apparatus 20 includes a U-shaped body 76 or U-shaped swinging piece 76. U-shaped body or U-shaped swinging piece 76 includes a top plate section 78 and two side plate sections 80, 82. Top plate section 78 is rectangular in shape and includes a proximal end 84 that works as a stop when the U-shaped piece 84 is swung to its fully open position. Proximal end 84 works as a stop by making contact with the upper surface of uppermost horizontal support member 46. Top plate section 78 further includes a distal end 86 that confronts relatively short horizontal piece 40 when the latch apparatus 10 is closed.

Each of the side plate sections 80, 82 extends vertically and downwardly from outer edges of top plate section 78. Each of the side plate sections 80, 82 includes an apertured proximal end 88 that engages a swing pin 89 or pivot pin 89 that extends through the horizontal support member 46. Pivot pin 89 permits U-shaped swinging piece 76 to swing between open and closed positions. Pin 89 extends through aperture 91 of each of the side plate sections 80, 82.

Each of the side plate sections 80, 82 further includes a slot 90. Slot 90 is elongate. Slot 90 includes an axis or elongate axis that is oblique to the horizontal. Slot 90 is oblique to the top plate section 78.

Each of the side plate sections 80, 82 includes an undulating intermediate lower edge portion 92 that provides height at a generally mid-section of the sections 80, 82 to accommodate the length of slot 90. Each of the side plate sections 80, 82 includes a C-shaped distal side and lower edge portion 94 that confronts relatively short horizontal piece 40 when the latch apparatus 10 is closed.

The distance between the inner faces of the side plate sections 80, 82 is slightly greater than the thickness of horizontal support member 46. When latch apparatus 10 is closed, the undersurface of top plate section 78 confronts the upper surface of the horizontal support member 46 and the inner faces of side plate sections 80, 82 confront the side faces of the horizontal support member 46.

Latch apparatus 10 includes individual, independent and opposing latches or sliders 12, 14. Independent latches or sliders 12, 14 are shown at least in FIGS. 4, 5, 15A, 15B and 16B. Each of the independent latches or sliders 12, 14 includes an outer round or circular head 96 and an inner round or circular head 98. The outer and inner heads 96, 98 are interconnected by a pin 100. Outer head 96 is pivotally engaged to pin 100 such that outer head 96 rotates independently of pin 100. Inner head 98 is fixed to pin 100 such that when inner head 98 rotates pin 100 rotates. Pin 100 slides in slot 90. Pin 100 rotates in slot 90. Pin 100 may slide and rotate in slot 90 at the same time. The diameter of pin 100 is about equal to or slightly less than the width of slot 90 to as to minimize rocking or play by the independent latches or sliders 12, 14 in their respective slots 90. The distance between the inner face of outer head 96 and the outer face of inner head 98 is about equal to or slightly greater than the thickness of each of the side plate sections 80, 82 so as to minimize a rocking or play of each of the independent latches or sliders 12, 14 in their respective slots 90. Outer head 96 includes a diameter greater than the width of slot 90 such that outer head 96 may not pass through slot 90. Inner head 98 includes a diameter greater than the width of slot 90 such that inner head 98 may not pass through slot 90. Outer and inner heads 96, 98 slidingly pinch or slidingly sandwich one respective side plate section 80, 82 therebetween such that each of the independent latches or sliders 12, 14 can slide in its respective slot 90, such that pin 100 and inner head 98 can rotate as a whole relative to outer head 96 and relative to U-shaped swinging piece 76, and such that outer head 96 can rotate relative to pin 100 and inner head 98 and relative to U-shaped swinging piece 76.

Slot 90 is defined by upper end 102 and lower end 104. Slot 90 is further defined by a lower straight edge 106 and an upper straight edge 108. Edges 106, 108 run parallel to each other. Lower straight edge 106 opposes the upper straight edge 108 of slot 90. Edges 106, 108 run parallel to an elongate axis of slot 90. Edges 106, 108 are oblique to the horizontal. Edges 106, 108 are oblique to the top plate section 78 that lies in a plane. When U-shaped swinging piece 76 is in the closed position, each of the independent latches or sliders 12, 14 slide by gravity from the upper end 102 of slot 90 to the lower end 104 of slot 90. Pin 100 slides on the lower straight edge 106 of slot 90 under gravity when the U-shaped swinging piece 76 is in a fully open position, when U-shaped swinging piece 76 is in a fully closed position, and when U-shaped swinging piece 76 is at every position therebetween. In other words, upper end 102 of slot 90 is always at a greater elevation than lower end 104 of slot 90 regardless of the position of the U-shaped swinging piece 76. Slots 90 are aligned with each other. Lower straight edges 106 of the slots 90 are coplanar. Upper straight edges 108 of the slots 90 are coplanar.

Latch apparatus 10 further includes a keeper and striker combination structure or piece 110. Piece 110 is a plug that plugs into an open outer end of horizontal support member 46. Piece 110 can be referred to as an extension of horizontal support member 46 and is rigidly fixed thereto. Piece 110 includes a base plate section 111 that lies in a vertical plane and closes off the open end of the horizontal support member 46. Piece 110 further includes a keeper plate section 112 that may also be referred to as a keeper or a keeper surface or under slide face. Keeper plate section or under slide face 112 includes a first proximal under slide end and a first distal under slide end, with a first under slide direction being defined as the direction from the first proximal under slide end that is adjacent to vertical support member 50 to the first distal under slide end that is immediately adjacent to the tip 118 of the extension or piece 110. Keeper plate section 112 extends obliquely from the bottom horizontal edge of base plate section 111. Keeper plate section 112 is oblique to the horizontal. Keeper plate section 112 is oblique relative to horizontal support member 46 and to an upper planar surface of horizontal support member 46. The axis of each of the slots 90 runs parallel to the plane of the keeper plate section 112 when the U-shaped swinging piece 76 is in the fully closed position. Keeper plate section 112 is supported by a pair triangular side plate sections 114 extending from vertical side edges of base plate section 111. The upper edges 116 of the triangular side plate sections can be referred to as strikers or striker edges 116 or as first and second over slide faces, where the over slide faces have respective first and second proximal over slide ends adjacent to horizontal support member 46 and first and second distal over slide ends immediately adjacent to the tip or junction 118. Striker edges 116 form a junction 118 with keeper plate section 112. Striker edges 116 run transversely to the keeper plate section 112. Striker edges 116 run obliquely to the horizontal. Striker edges 116 run obliquely to the horizontal support member 46 and to the upper planar surface of horizontal support member 46. Striker edges 116 run downwardly and outwardly from the upper surface of horizontal support member 46. Combination piece 110 is wholly received with the inside of U-shaped swinging piece 76. When latch apparatus 10 is viewed from either side in an elevation view when latch apparatus 10 is closed, combination piece 110 cannot be seen regardless of the positions of the independent latches or sliders 12, 14 in their respective slots 90. Keeper plate section 112 is a keeper of independent latches or sliders 12, 14.

Combination piece 110 is integral and one-piece. In other words, base plate section 111, keeper plate section 112, side plate sections 114, striker edges 116, and junction 118 are one-piece and integral. Combination piece 110 is preferably formed of plastic.

Figure 6A:
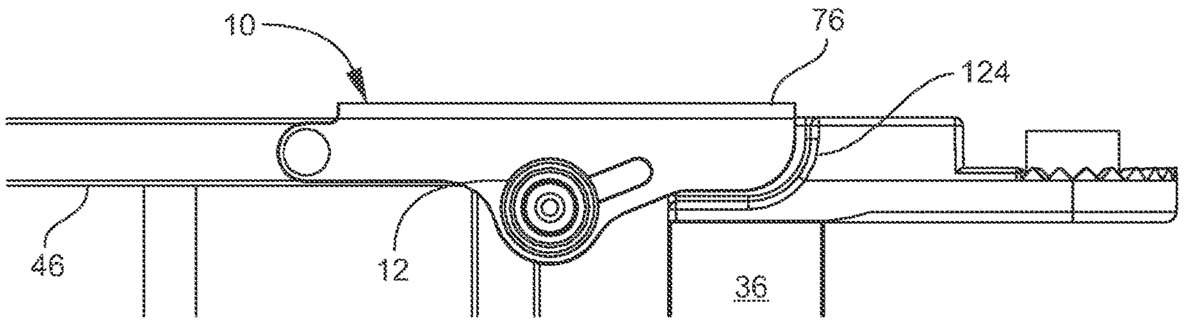
FIG. 6A is a front elevation view of the latch apparatus of FIG. 1 in a closed position, with the first and second sliders positioned to prevent the swinging piece of the latch apparatus from being opened.
Figure 6B:
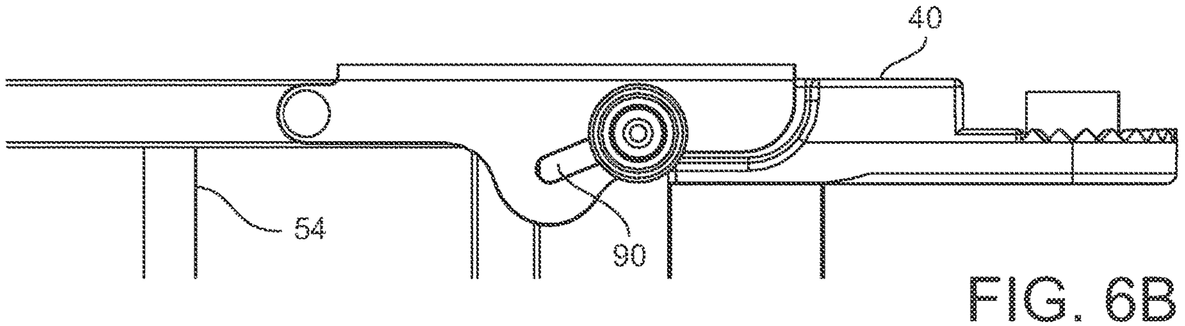
FIG. 6B is a front elevation view of the latch apparatus of FIG. 1 in a closed position, with the first and second sliders positioned to permit the swinging piece of the latch apparatus to be opened.
Figure 6C:
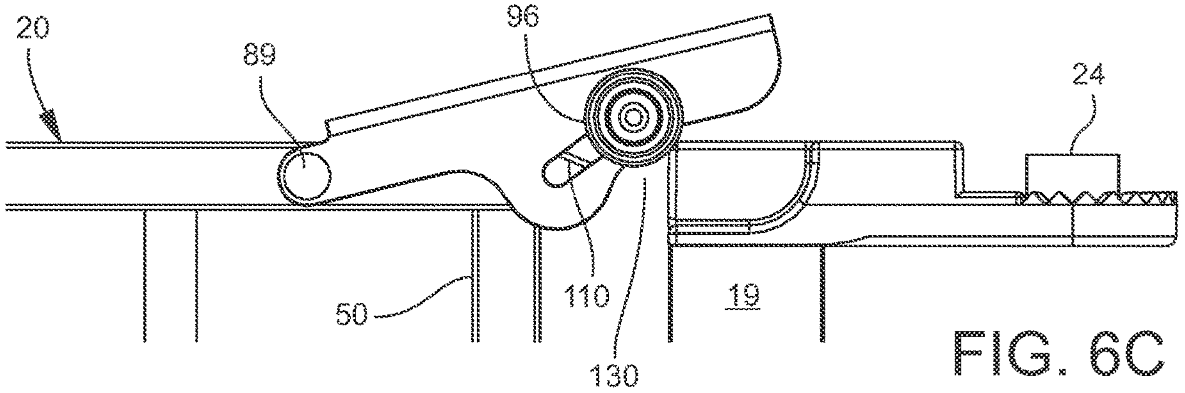
FIG. 6C is a front elevation view of the latch apparatus of FIG. 1 in an open position that permits the gate to be swung open.
Figure 6D:
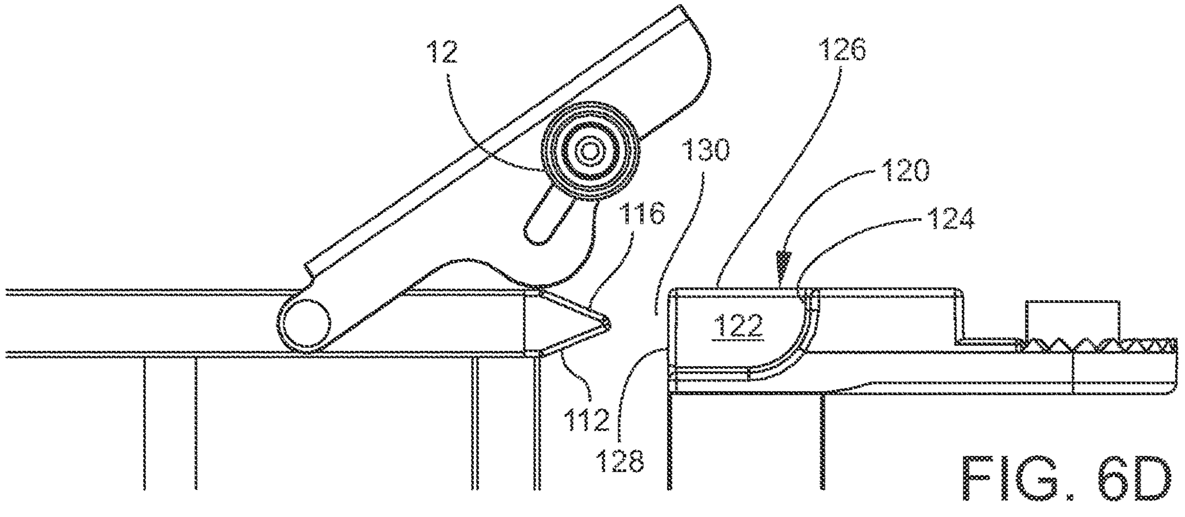
FIG. 6D is a front elevation view of the latch apparatus of FIG. 1 in an open position that permits the gate to be swung open.

As shown in FIG. 6D, latch apparatus 10 further includes a keeper 120 formed in relatively short horizontal support member 40. Keeper 120 is a keeper for the U-shaped swinging piece 76. Keeper 120 includes a pair of sidewalls 122 that define a thickness of keeper 120. Each of the sidewalls 122 is defined by an L-shaped or C-shaped inwardly extending edge 124. C-shaped edge 124 runs parallel to distal C-shaped edge 94 of the U-shaped swinging piece 76 so as to visually communicate to the user the closed position for the U-shaped swinging piece 76. Keeper 120 has a thickness about equal to or slightly less than the distance between the inner faces of the side plate sections 80, 82 of U-shaped swinging piece 76 so as to minimize side-to-side play of the latch apparatus 10. Side plate sections 80, 82 slidingly pinch or slidingly sandwich keeper 120 therebetween. Keeper 120 includes an upper flat surface 126 that provides a stop to the U-shaped swinging piece 76. The underside of top plate section 78 makes contact with the top surface 126 of the keeper 120 to stop the closing swinging motion of the U-shaped swinging piece 76. Keeper 120 further includes an outer vertical front or end surface 128 that is spaced apart from the tip or junction 118 of the combination piece 110 by a distance or space 130 that is greater than the diameter of the inner head 98 such that the inner head 98 can travel freely and unimpeded through the space 130 between the tip 118 and the end or front surface 128.

U-shaped swinging piece 76 has at least five keepers. A first keeper is a face portion of the keeper plate section 112 for first independent latch or slider 12. This first keeper prevents the U-shaped swinging piece 76 from swinging upwardly when the independent latch or slider 12 is positioned on or at the keeper plate section 112. A second keeper is a face portion of the keeper plate section 112 for second independent latch or slider 14. This second keeper prevents the U-shaped swinging piece 76 from swinging upwardly when the independent latch or slider 14 is positioned on or at the keeper plate section 112. A third keeper is the upper surface 126 of keeper 120. This third keeper prevents the U-shaped swinging piece 76 from swinging further downwardly by making contact with the top plate section 78 of the U-shaped swinging piece 76. A fourth keeper is a first side surface 122 of keeper 120. This fourth keeper prevents side movement of the U-shaped swinging piece 76 in a first direction and thus prevents a swinging of the gate 20 in such first direction. A fifth keeper is a second side surface 122 of keeper 120. This fifth keeper prevents side movement of the U-shaped swinging piece 76 in a second direction and thus prevents a swinging of the gate 20 in such second direction.

In operation, FIGS. 6A, 6B, 6C and 6D show latch apparatus 10 opening from a fully closed position in FIG. 6A to a fully open position in FIG. 6D.

FIG. 6A shows that a distal end section of the U-shaped swinging piece 76 is engaged with the keeper 120 and that first and second independent latches or sliders 12, 14 are engaged with keeper 112. Since the slots 90 are aligned with each other, and since no part of independent latch or slider 14 is shown, it follows that independent latch or slider 14 is in the lower end 104 of slot 90 and engaged to keeper 112. In this position, independent latches or sliders 12, 14 are coaxial with each other such that all of the outer heads 96, inner heads 98 and pin or shaft 100 are coaxial.

FIG. 6B shows that the distal end section of U-shaped swinging piece 76 is still engaged to its keeper 120, but that each of the independent latches or sliders 12, 14 have been slid from its respective proximal or lower end 104 of slot 90 to its respective upper or distal end 102 of slot 90. In this position, the inner heads 98 of the independent latches or sliders 12, 14 have been slid beyond the junction 118 of the keeper 112 and strikers 116.

FIG. 6C shows that an upward pressure has been exerted on the U-shaped swinging piece 76 and that the inner heads 98 have swung through space 130 between junction 118 and keeper front surface 128. Gate 20 may be swung open relative to barrier section 19 in this position since the U-shaped swinging piece 76 and the outer heads 96 will substantially clear the keeper 120.

FIG. 6D shows that a further upward pressure has been exerted on the U-shaped swinging piece 76. Gate 20 may be swung open relative to barrier section 19 with the U-shaped swinging piece 76 in this position.

Figure 7A:
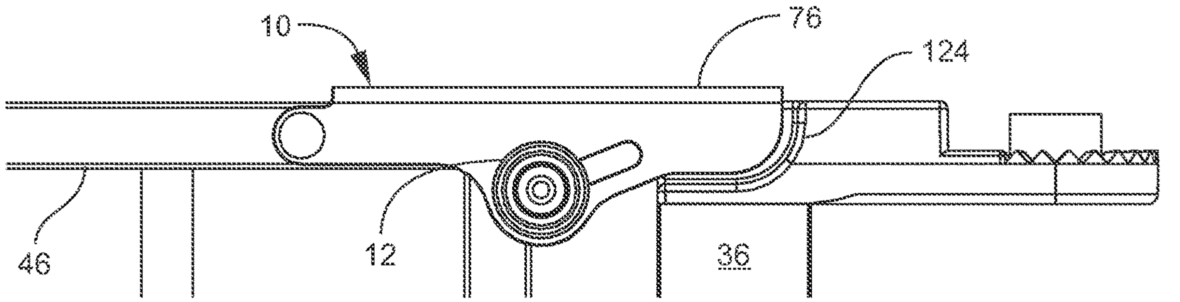
FIG. 7A is a front elevation view of the latch apparatus of FIG. 1 in a closed position, with the first and second sliders positioned to prevent the swinging piece of the latch apparatus from being opened.
Figure 7B:
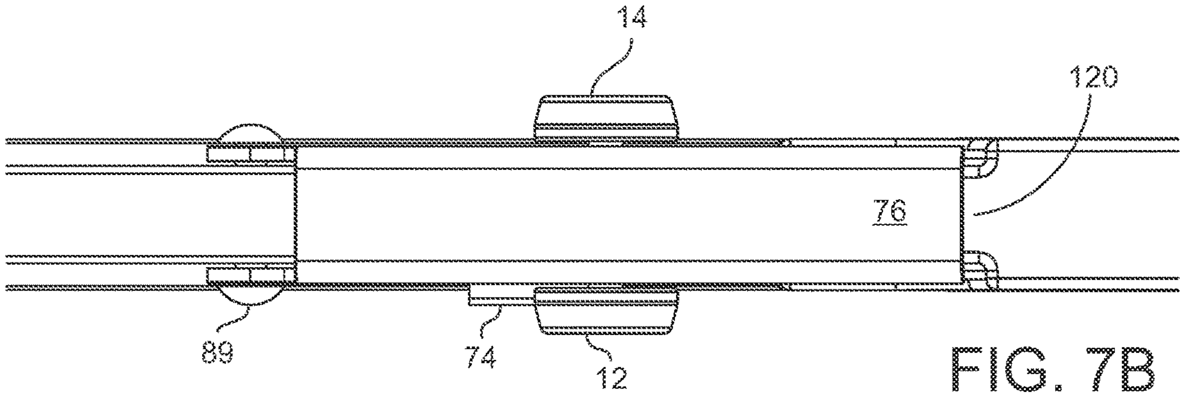
FIG. 7B is a top plan view of the latch apparatus of FIG. 7A in a closed position, with the first and second sliders positioned to prevent the swinging piece of the latch apparatus from being opened.
Figure 7C:
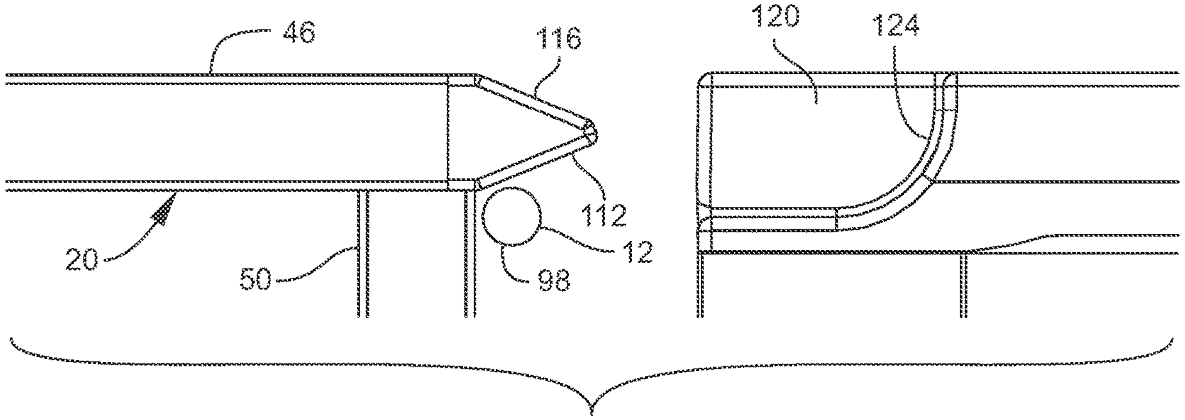
FIG. 7C is a front schematic view of the latch apparatus of FIG. 7A in a closed position, with the first and second sliders positioned to prevent the swinging piece of the latch apparatus from being opened.
Figure 7D:
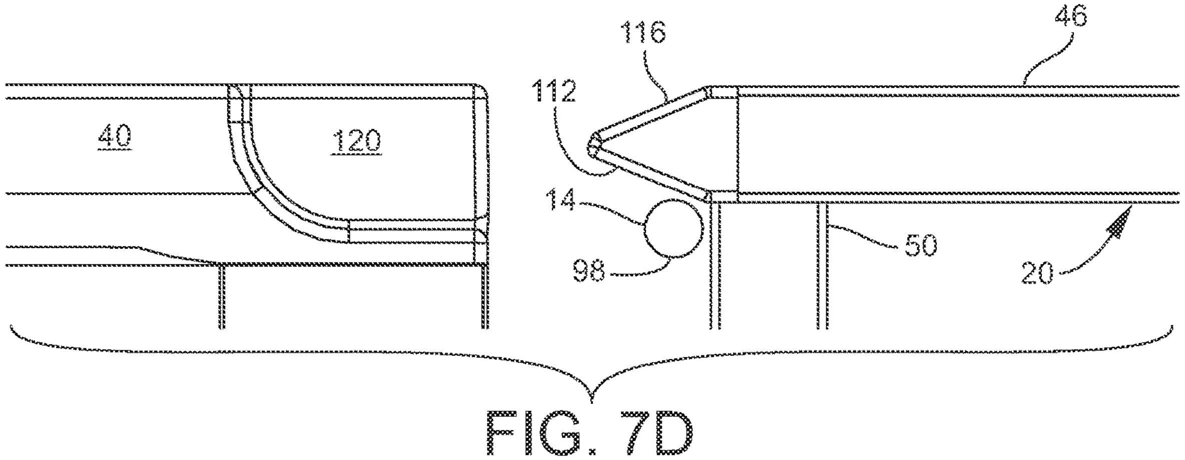
FIG. 7D is a rear schematic view of the latch apparatus of FIG. 7A in a closed position, with the first and second sliders positioned to prevent the swinging piece of the latch apparatus from being opened.

FIGS. 7A, 7B, 7C and 7D show the latch apparatus 10 in the same position. FIGS. 7A, 7B, 7C and 7D show that a distal end section of the U-shaped swinging piece 76 is engaged with the keeper 120 and that first and second independent latches or sliders 12, 14 are engaged with keeper 112. FIG. 7C shows the position of the inner head 98 of independent latch or slider 12. FIG. 7D shows the position of inner head 98 of independent latch or slider 14.

It should be noted that manufacturing tolerances are built into the structural relationships among the outer head 96, inner head 98, pin 100, slot 90, keeper 112, and strikers 116 such that, at rest, inner head 98 of independent latches or sliders 12, 14 will be disposed slightly spaced from keeper 112.

Figure 8A:
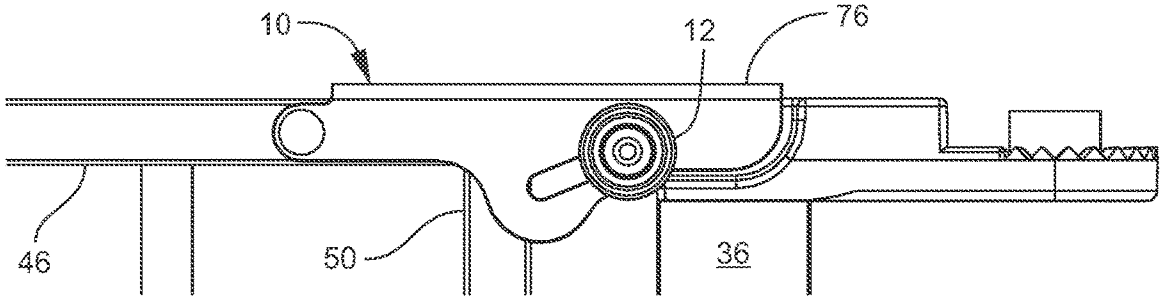
FIG. 8A is a front elevation view of the latch apparatus of FIG. 1 in a closed position, with the first and second sliders positioned to permit the swinging piece of the latch apparatus to be opened.
Figure 8B:
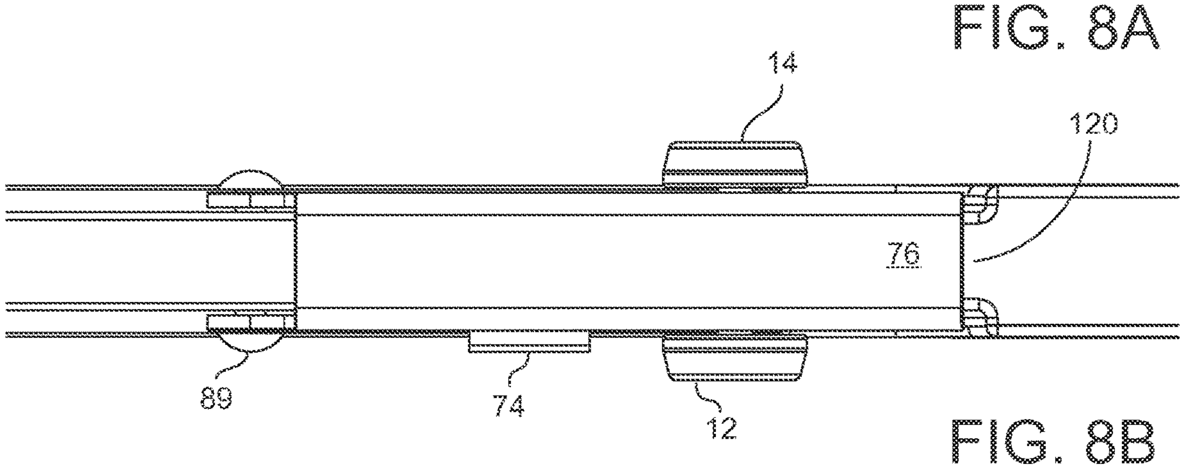
FIG. 8B is a top plan view of the latch apparatus of FIG. 8A in a closed position, with the first and second sliders positioned to permit the swinging piece of the latch apparatus to be opened.
Figure 8C:
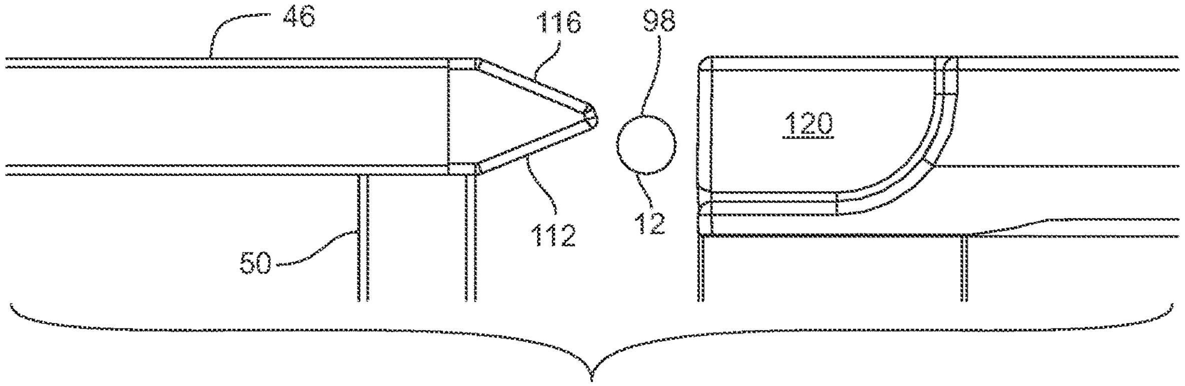
FIG. 8C is a front schematic view of the latch apparatus of FIG. 8A in a closed position, with the first and second sliders positioned to permit the swinging piece of the latch apparatus to be opened.
Figure 8D:
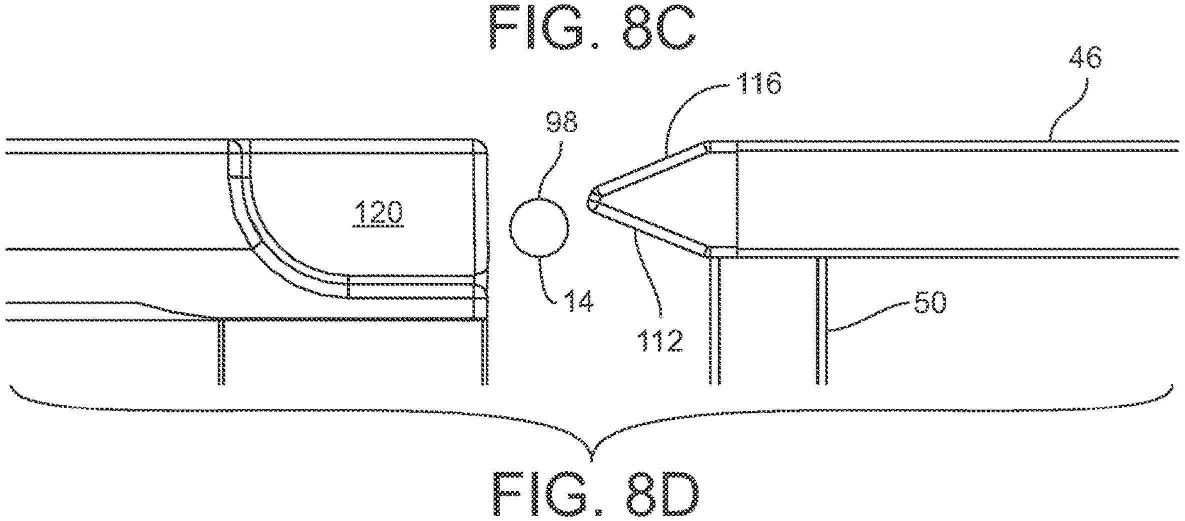
FIG. 8D is a rear schematic view of the latch apparatus of FIG. 8A in a closed position, with the first and second sliders positioned to permit the swinging piece of the latch apparatus to be opened.

FIGS. 8A, 8B, 8C and 8D show the latch apparatus 10 in the same position. These FIGS. 8A, 8B, 8C and 8D show that the distal end section of U-shaped swinging piece 76 is engaged to its keeper 120, but that each of the independent latches or sliders 12, 14 have been slid from its respective proximal or lower end 104 of slot 90 to its respective upper or distal end 102 of slot 90 such that U-shaped swinging piece 76 is disengaged from its keeper 112 and free to swing. In this position, the inner heads 98 of the independent latches or sliders 12, 14 have been slid beyond the junction 118 of the keeper 112 and strikers 116. It should be noted that independent latches or sliders 12, 14 are not engaged to each other in any way. Latches or sliders 12, 14 slide independently of each other in their respective slots 90. Latches or sliders 12, 14 rotate or spin in slots 90 independently of each other. Latch or slider 12, or specifically inner head 98 thereof, may rotate and slide at the same time to minimize any friction of the inner head 98 with keeper 112 or strikers 116. Latch or slider 14, or specifically inner head 98 thereof, may rotate and slide at the same time to minimize any friction of inner head 98 with keeper 112 or strikers 116. FIG. 8C shows the position of the inner head 98 of independent latch or slider 12. FIG. 8D shows the position of inner head 98 of independent latch or slider 14.

Figure 9A:
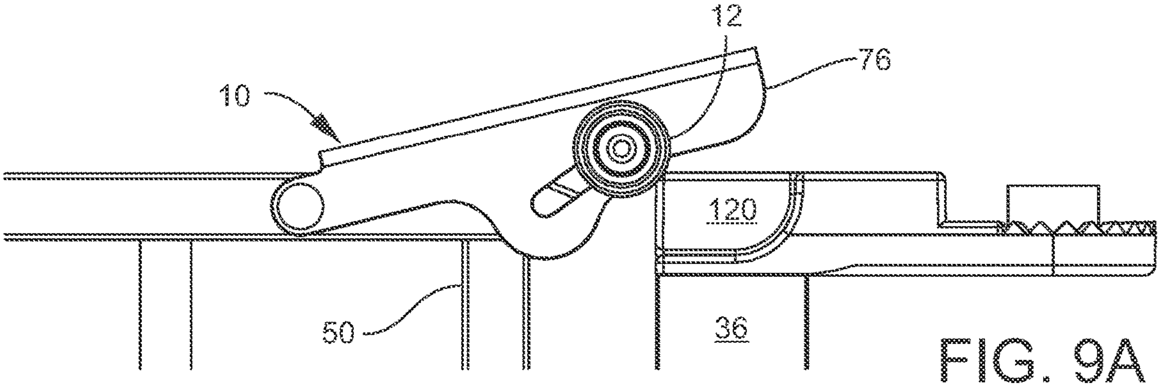
FIG. 9A is a front elevation view of the latch apparatus of FIG. 1 in an open position that permits the gate to be swung open.
Figure 9B:
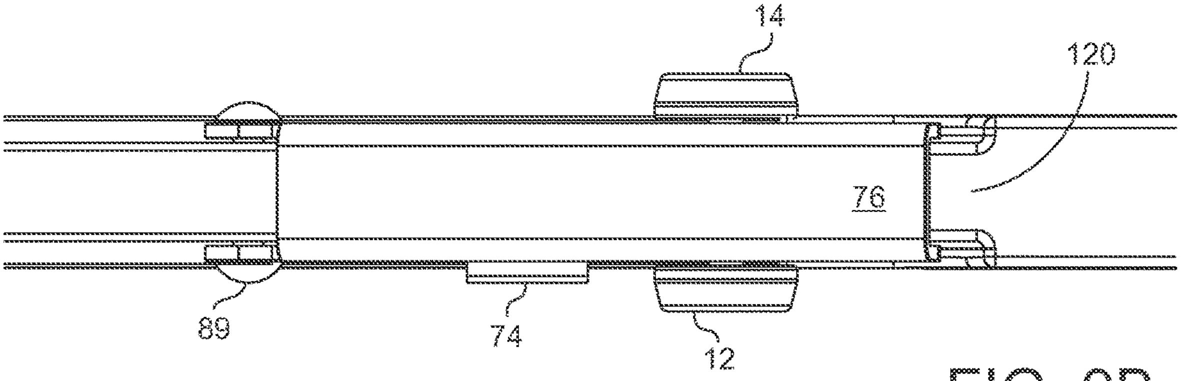
FIG. 9B is a top plan view of the latch apparatus of FIG. 9A in an open position that permits the gate to be swung open.
Figure 9C:
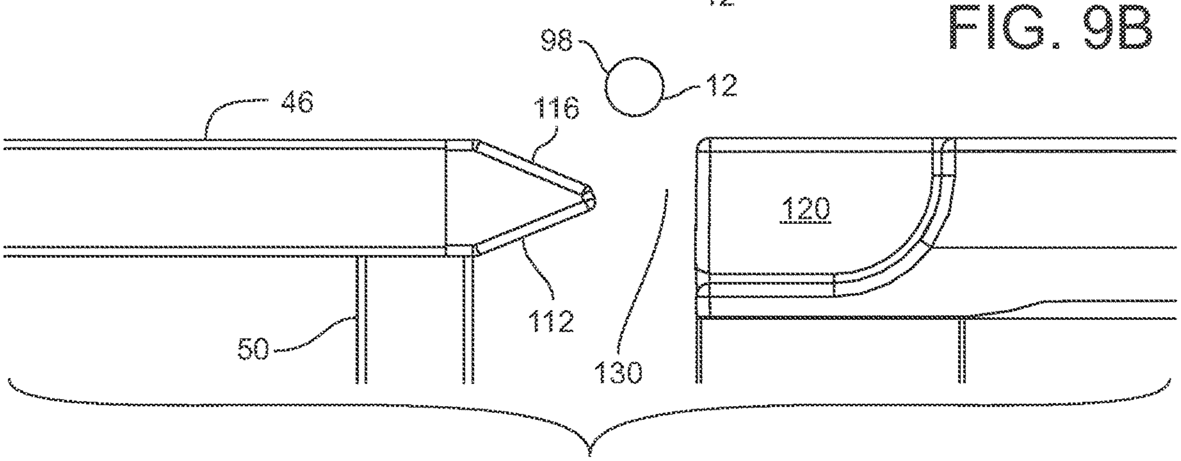
FIG. 9C is a front schematic view of the latch apparatus of FIG. 9A in an open position that permits the gate to be swung open.
Figure 9D:
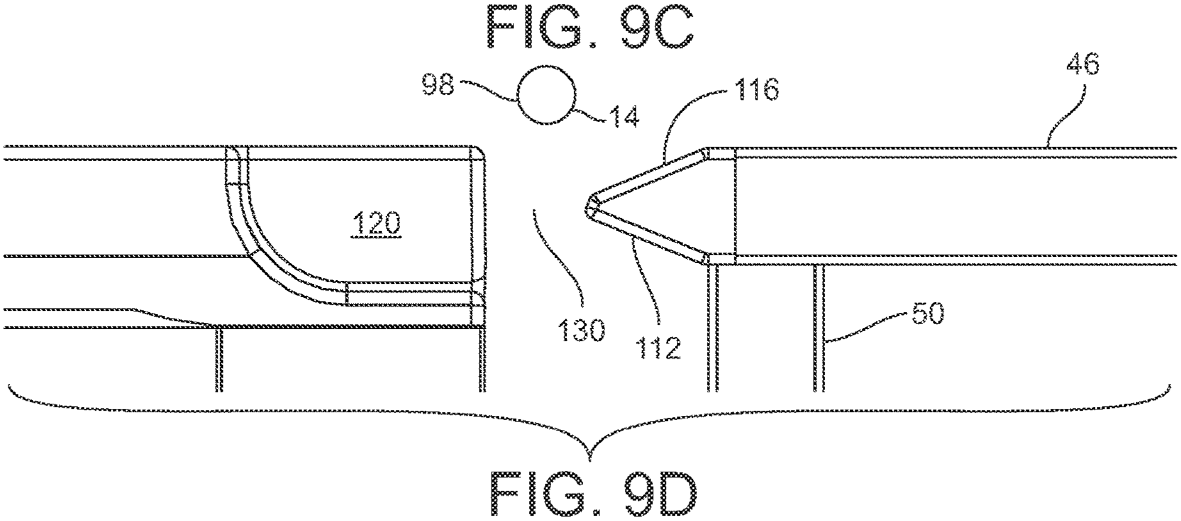
FIG. 9D is a rear schematic view of the latch apparatus of FIG. 9A in an open position that permits the gate to be swung open.

FIGS. 9A, 9B, 9C and 9D show the latch apparatus 10 in the same position. These FIGS. 9A, 9B, 9C and 9D show that an upward pressure has been exerted on the U-shaped swinging piece 76 and that the inner heads 98 have swung through space 130 between junction 118 and keeper front surface 128. Gate 20 may be swung open relative to barrier section 19 in this position since the U-shaped swinging piece 76 and the outer heads 96 will substantially clear the keeper 120. FIG. 9C shows the position of the inner head 98 of independent latch or slider 12. FIG. 9D shows the position of inner head 98 of independent latch or slider 14.

Figure 10A:
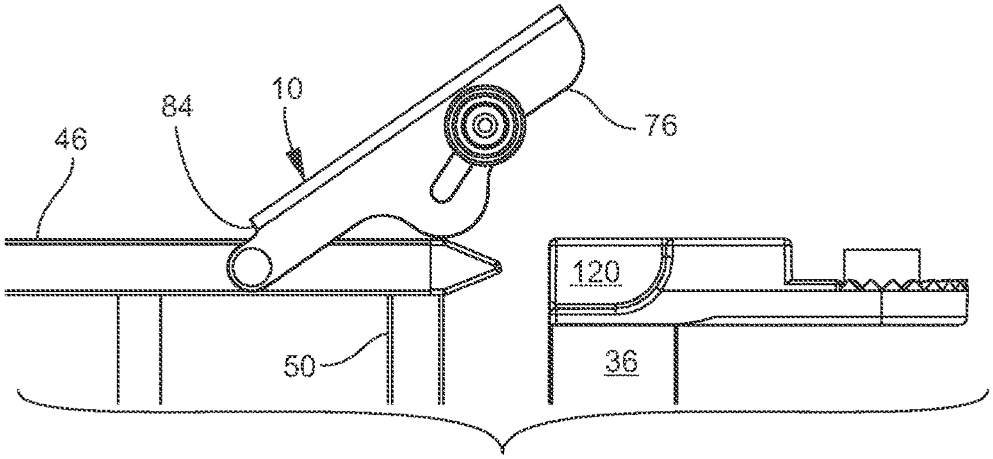
FIG. 10A is a front elevation view of the latch apparatus of FIG. 1 in an open position that permits the gate to be swung open.
Figure 10B:
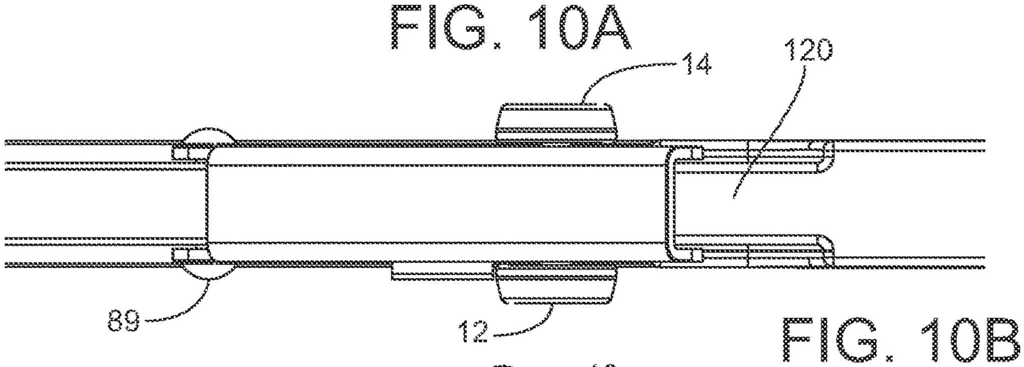
FIG. 10B is a top plan view of the latch apparatus of FIG. 10A in an open position that permits the gate to be swung open.
Figure 10C:
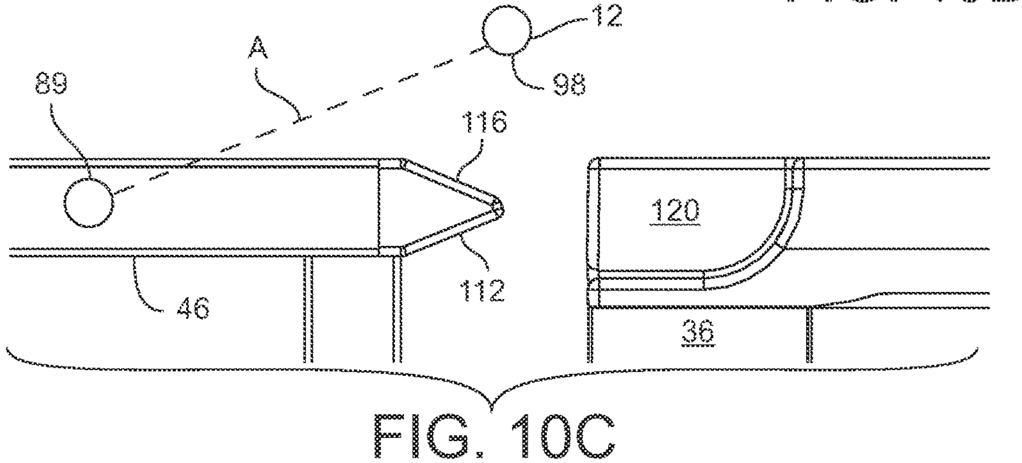
FIG. 10C is a front schematic view of the latch apparatus of FIG. 10A in an open position that permits the gate to be swung open.
Figure 10D:
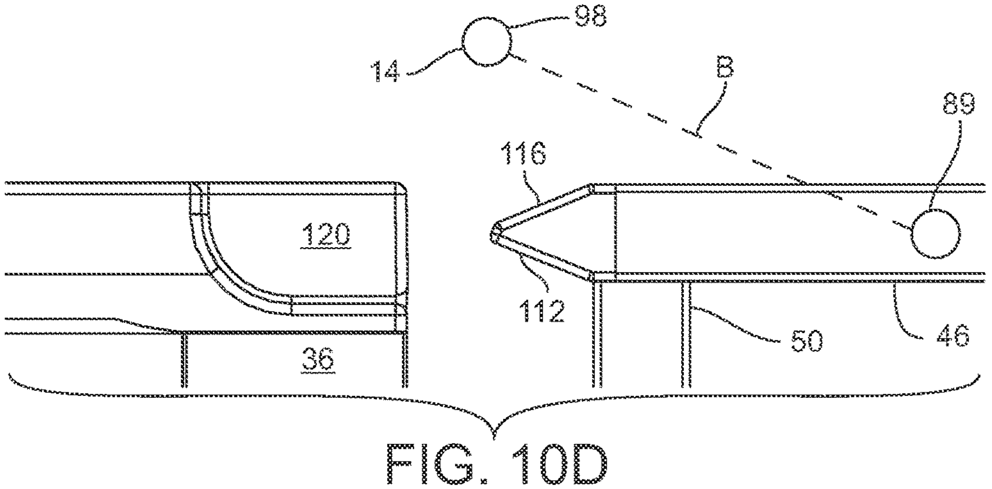
FIG. 10D is a rear schematic view of the latch apparatus of FIG. 10A in an open position that permits the gate to be swung open.

FIGS. 10A, 10B, 10C and 10D show the latch apparatus 10 in the same position. These FIGS. 10A, 10B, 10C and 10D show that a further upward pressure has been exerted on the U-shaped swinging piece 76. Gate 20 may be swung open relative to barrier section 19 with the U-shaped swinging piece 76 in this position. FIG. 10C shows the position of the inner head 98 of independent latch or slider 12. FIG. 10D shows the position of inner head 98 of independent latch or slider 14. The phantom line A in FIG. 10C shows a distance between pivot pin 89 and inner head 98 of independent latch or slider 12. The phantom line B in FIG. 10D shows a distance between pivot pin 89 and inner head 98 of independent latch or slider 14. Such distances are the same.

Figure 11A:
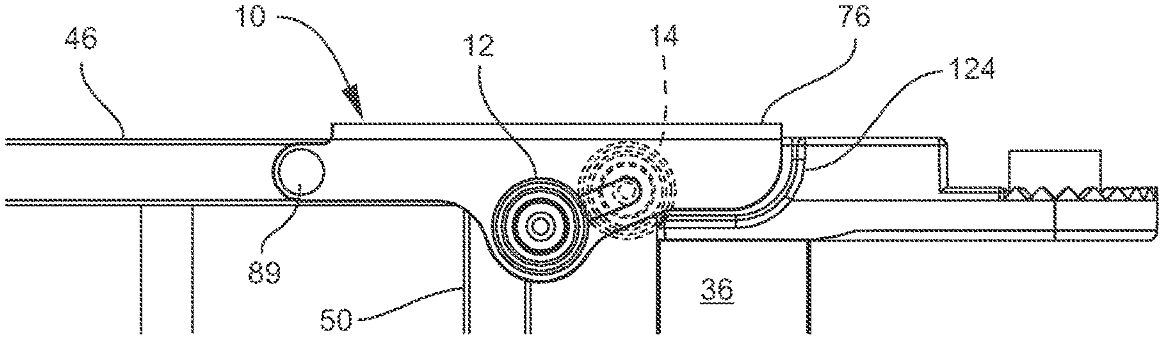
FIG. 11A is a front elevation, partially phantom view of the latch apparatus of FIG. 1 in a closed position, with the first slider positioned so as to prevent the swinging piece of the latch apparatus from being opened, with the second slider shown in phantom and positioned to permit the swinging piece of the latch apparatus to be opened such that, in this configuration, the swinging piece cannot be opened.
Figure 11B:
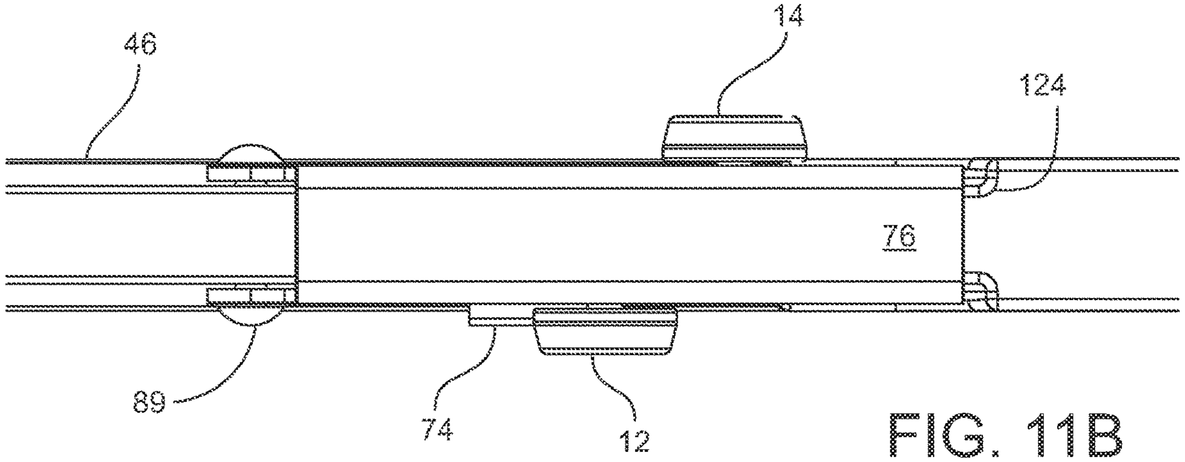
FIG. 11B is a top plan view of the latch apparatus of FIG. 11A.
Figure 11C:
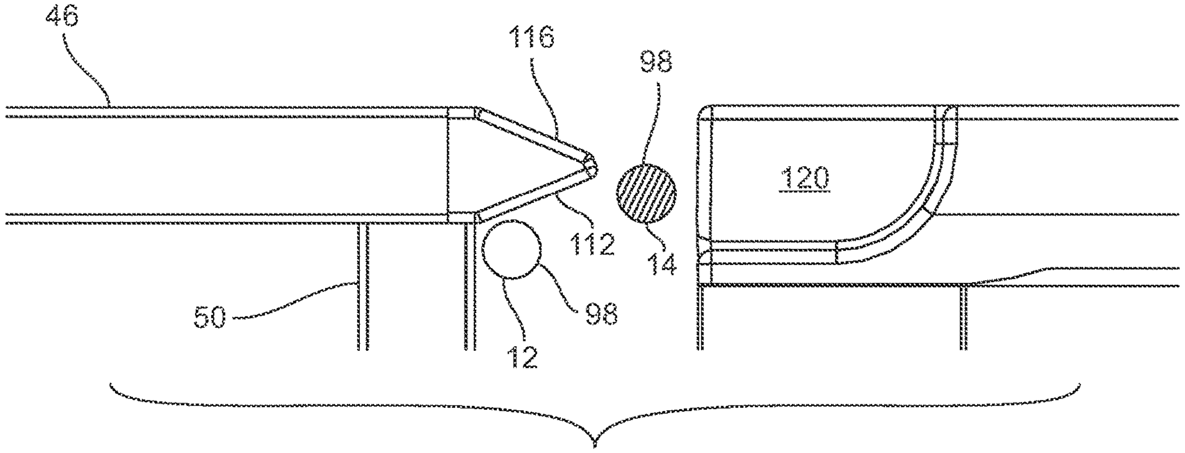
FIG. 11C is a front schematic view of the latch apparatus of FIG. 11A.

FIGS. 11A, 11B, and 11C show the latch apparatus 10 in the same position. These FIGS. 11A, 11B and 11C show independent latch or slider 12 in a position to engage keeper 112 and independent latch or slider 14 free of keeper 112. Since one of the independent latches or sliders 12, 14 is in position to engage keeper 112 if an attempt is made to disengage U-shaped swinging piece 76 from keeper 120 by pivoting U-shaped swinging piece 76 upwardly, U-shaped swinging piece 76 will not disengage from keeper 120. Instead, the inner head 98 of independent latch or slider 12 will engage keeper 112. It should be noted that the inner head 98 of independent latch or slider 12 will not slide up keeper 112 when one attempts to swing upwardly U-shaped swinging piece 76. Instead, inner head 98 of independent latch or slider 12 is drawn at substantially a right angle toward keeper 112 regardless of whether the inner head 98 of independent latch or slider 12 is closer to proximal slot end 104 or distal slot end 102.

Figure 12A:
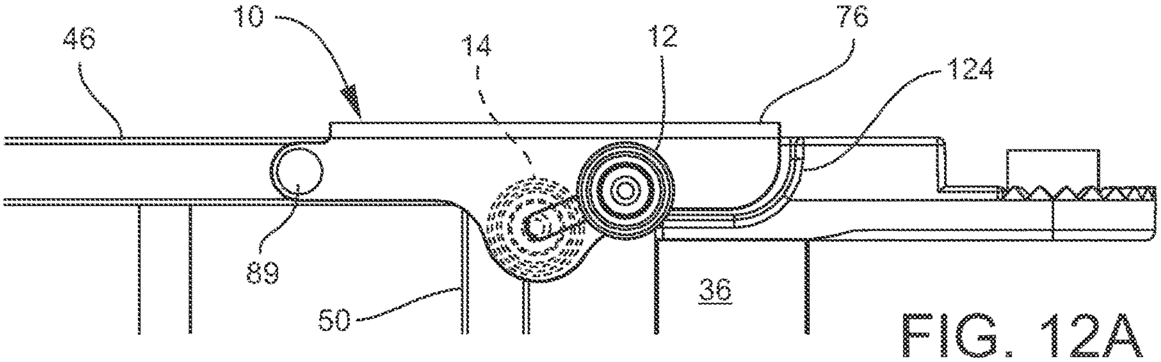
FIG. 12A is a front elevation, partially phantom view of the latch apparatus of FIG. 1 in a closed position, with the second slider positioned so as to prevent the swinging piece of the latch apparatus from being opened, with the first slider shown in phantom and positioned to permit the swinging piece of the latch apparatus to be opened such that, in this configuration, the swinging piece cannot be opened.
Figure 12B:
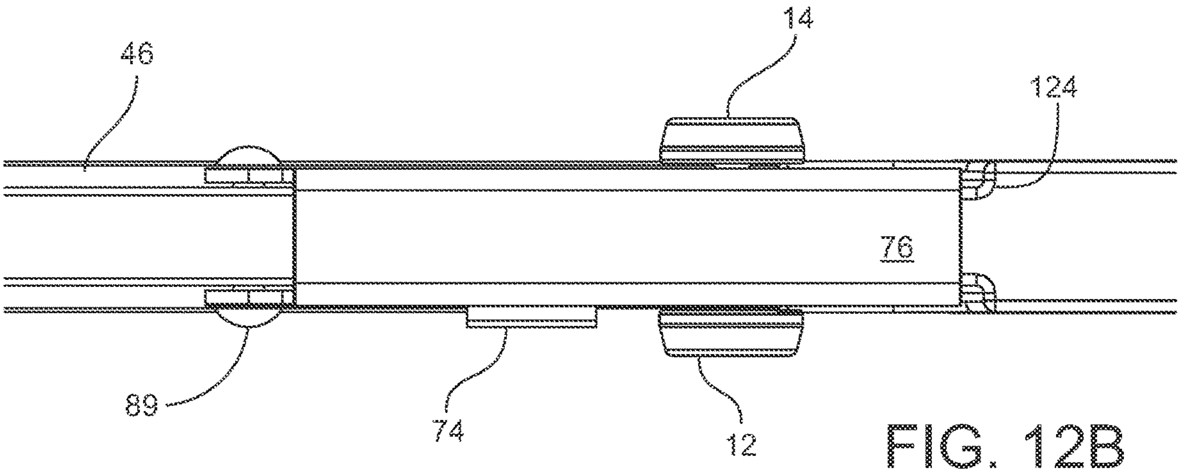
FIG. 12B is a top plan view of the latch apparatus of FIG. 12A.
Figure 12C:
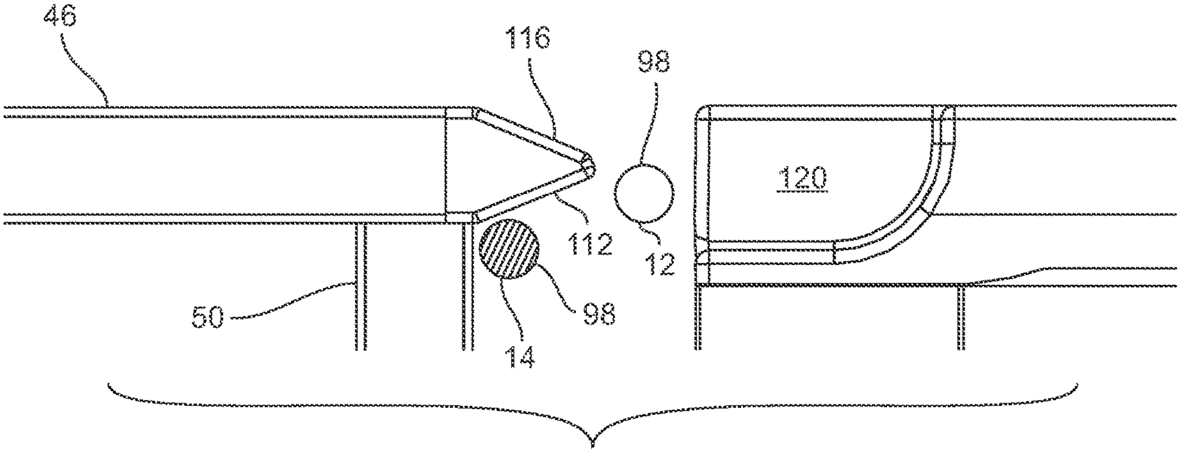
FIG. 12C is a front schematic view of the latch apparatus of FIG. 12A.

FIGS. 12A, 12B, and 12C show the latch apparatus 10 in the same position. These FIGS. 12A, 12B and 12C show independent latch or slider 14 in a position to engage keeper 112 and independent latch or slider 12 free of keeper 112. Since one of the independent latches or sliders 12, 14 is in position to engage keeper 112 if an attempt is made to disengage U-shaped swinging piece 76 from keeper 120 by pivoting U-shaped swinging piece 76 upward, U-shaped swinging piece 76 will not disengage from keeper 120. Instead, the inner head 98 of independent latch or slider 14 will engage keeper 112. It should be noted that the inner head 98 of independent latch or slider 14 will not slide up keeper 112 when one attempts to swing upwardly U-shaped swinging piece 76. Instead, inner head 98 of independent latch or slider 14 is drawn at substantially a right angle toward keeper 112 regardless of whether the inner head 98 of independent latch or slider 14 is closer to proximal slot end 104 or distal slot end 102.

Figure 13A:
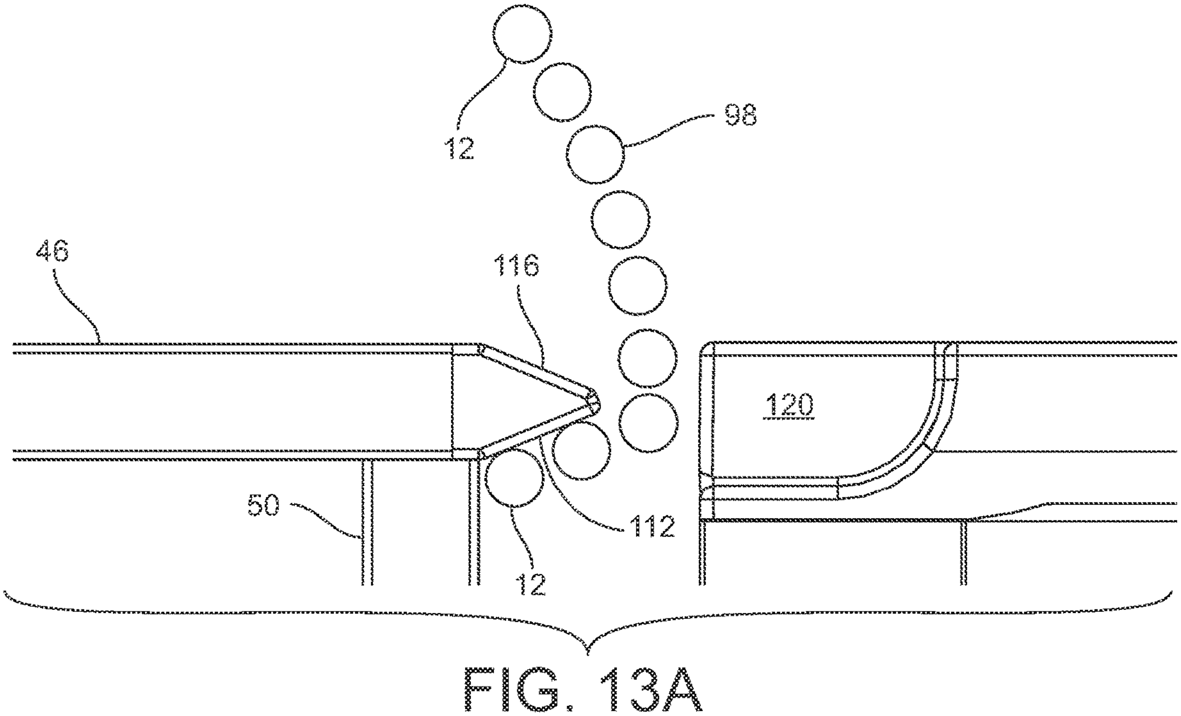
FIG. 13A is a front schematic view of the latch apparatus of FIG. 1 showing positions of the first slider over a period of time as the first slider is slid and as the swinging piece is pivotally opened.

FIG. 13A shows actual engagement of inner head 98 of independent latch or slider 12 on keeper 112. Keeper 112 does not permit U-shaped swinging piece 76 to be lifted where the inner head 98 makes contact with keeper 112. A user must slide the inner head 98 of independent latch or slider 12 beyond the keeper 112 in order for U-shaped swinging piece 76 to be lifted, presuming inner head 98 of independent latch or slider 14 has also been slid to a position beyond keeper 112. FIG. 13A shows multiple positions of the inner head 98 of independent latch or slider 12 where each of the multiple positions represents a snapshot at a different time during the swinging of U-shaped swinging piece 76. FIG. 13A shows that a user is exerting an upward pressure on the outer head 96 of independent latch or slider 12 such that the inner head 98 of independent latch or slider 12 will engage keeper 112. Outer head 96 of independent latch or slider 12 can be employed as a lift or finger handle to lift the U-shaped swinging piece 76.

Figure 13B:
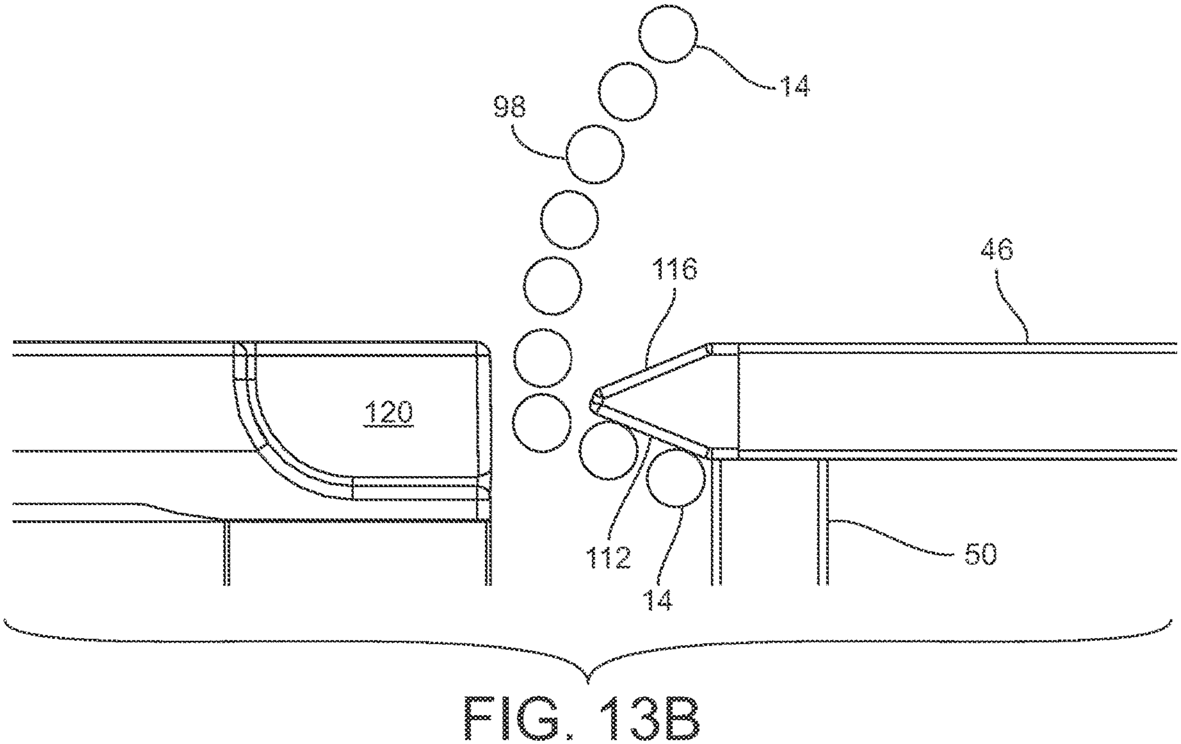
FIG. 13B is a rear schematic view of the latch apparatus of FIG. 13A showing positions of the second slider over a period of time as the second slider is slid and as the swinging piece is pivotally opened.

FIG. 13B shows actual engagement of inner head 98 of independent latch or slider 14 on keeper 112. Keeper 112 does not permit U-shaped swinging piece 76 to be lifted where the inner head 98 makes contact with keeper 112. A user must slide the inner head 98 of independent latch or slider 14 beyond the keeper 112 in order for U-shaped swinging piece 76 to be lifted, presuming inner head 98 of independent latch or slider 12 has also been slid to a position beyond keeper 112. FIG. 13B shows multiple positions of the inner head 98 of independent latch or slider 14 where each of the multiple positions represents a snapshot at a different time during the swinging of U-shaped swinging piece 76. FIG. 13B shows that a user is exerting an upward pressure on the outer head 96 of independent latch or slider 14 such that the inner head 98 of independent latch or slider 14 will engage keeper 112. Outer head 96 of independent latch or slider 14 can be employed as a lift or finger handle to lift the U-shaped swinging piece 76.

Figure 14A:
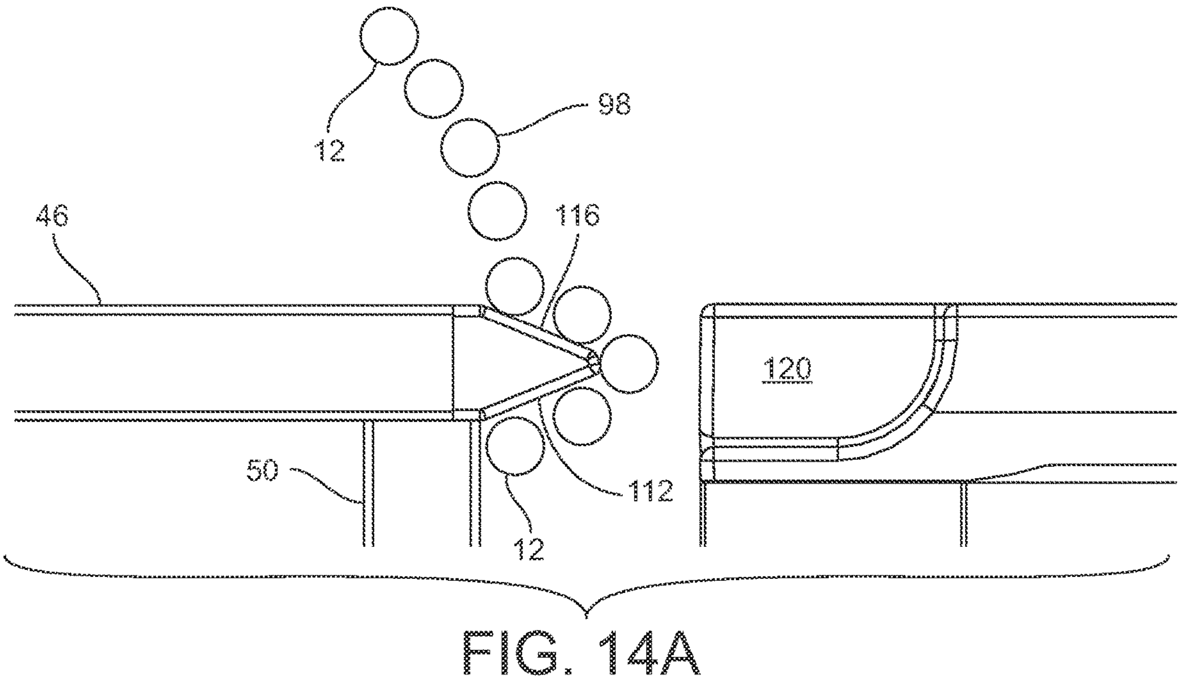
FIG. 14A is a front schematic view of the latch apparatus of FIG. 1 showing positions of the first slider over a period of time as the swinging piece is pivotally closed and as the first slider slides to a rest position.

FIG. 14A shows how the inner head 98 of independent latch or slider 12 may relate to its respective striker 116 and keeper 112 when the U-shaped swinging piece 76 is closed from an open position to a closed position. FIG. 14A shows the case where a user does not engage the outer head 96 of independent latch or slider 12 but simply lets U-shaped swinging piece 76 fall by itself under gravity back to the closed position. FIG. 14A shows multiple positions of the inner head 98 of independent latch or slider 12 where each of the multiple positions represents a snapshot at a different time during the swinging down of U-shaped swinging piece 76. Under the influence of gravity, the inner head 98 of independent latch or slider 12 will slide down or roll down or undergo a combination of a sliding and rolling upon its respective striker 116. Then, after the inner head 98 of independent latch or slider 12 clears junction 118, the inner head 98 of independent latch or slider 12 will space itself from the keeper 112 as the independent latch or slider 12 continues to slide down the slot 90. It should be noted that as soon as the user lets go of the U-shaped swinging piece 76 when the U-shaped swinging piece 76 is in an open position, independent latch or slider 12 will begin to slide down its respective slot 90 since at all times the distal slot end 102 is at a greater elevation than proximal slot end 104.

Figure 14B:
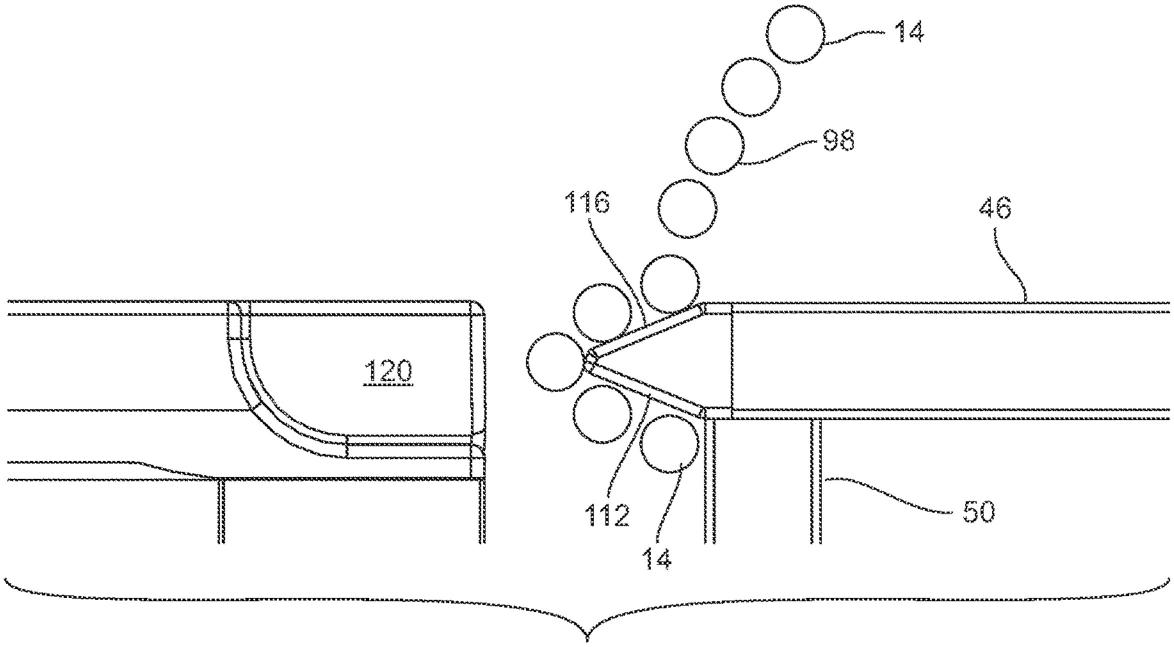
FIG. 14B is a rear schematic view of the latch apparatus of FIG. 14A showing positions of the second slider over a period of time as the swinging piece is pivotally closed and as the second slider slides to a rest position.
Figure 15A:
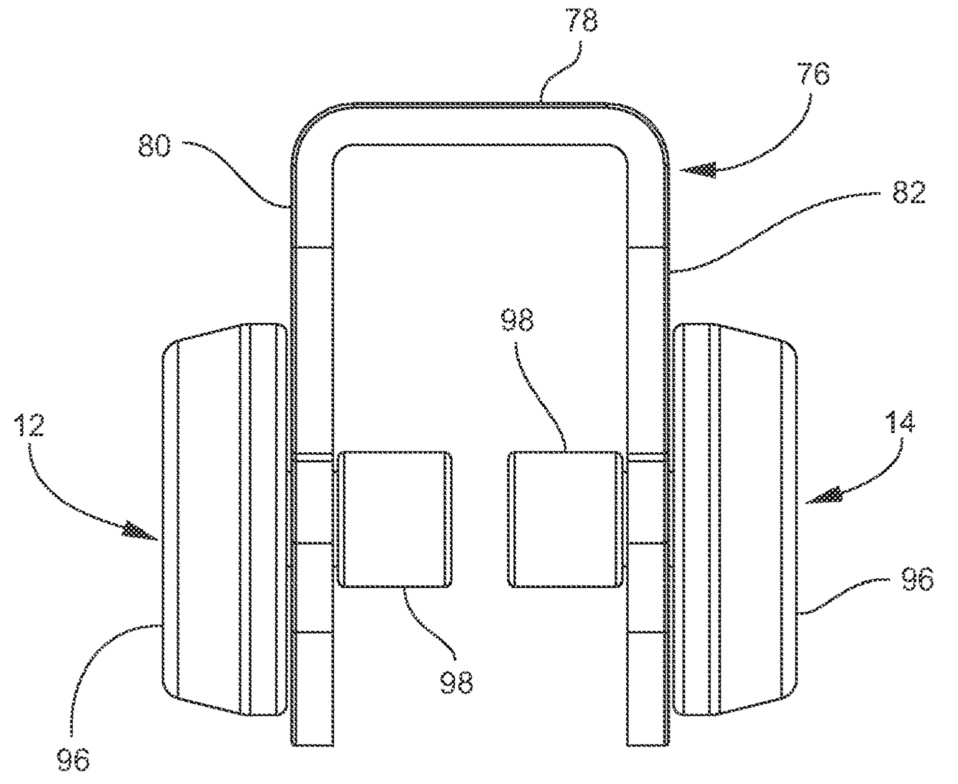
FIG. 15A is a side elevation isolated view of a portion of the latch apparatus of FIG. 1.
Figure 15B:
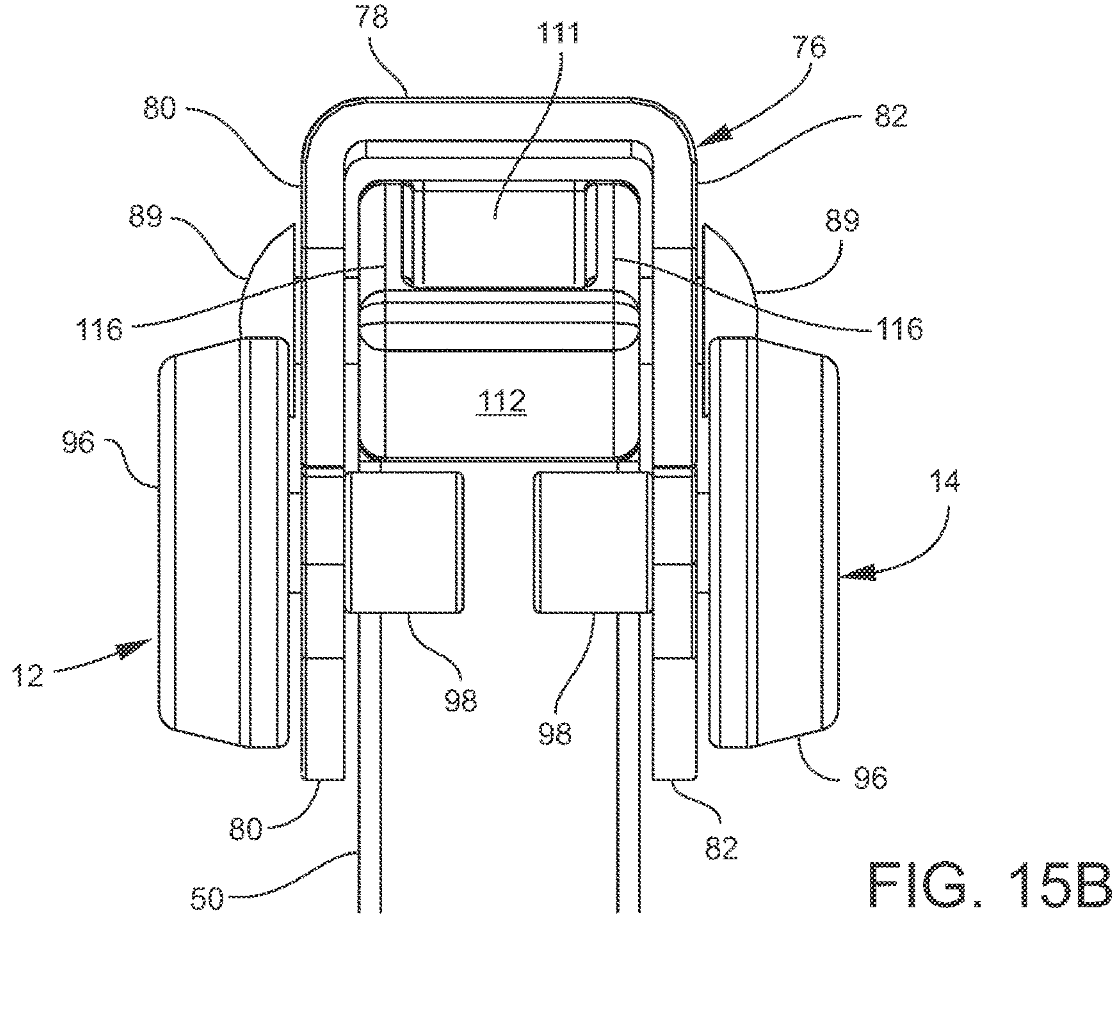
FIG. 15B is a side elevation view of the latch apparatus of FIG. 1 as positioned on the gate of FIG. 1.
Figure 16A:
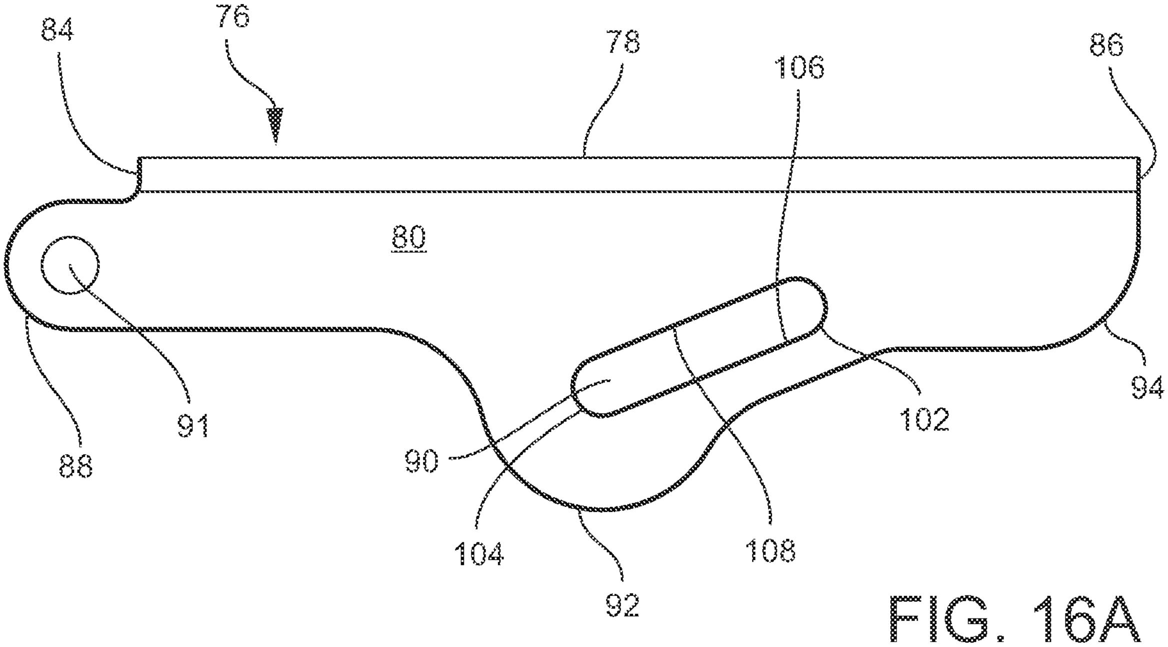
FIG. 16A is a front elevation view of the U-shaped swinging piece of the latch apparatus of FIG. 1.
Figure 16B:
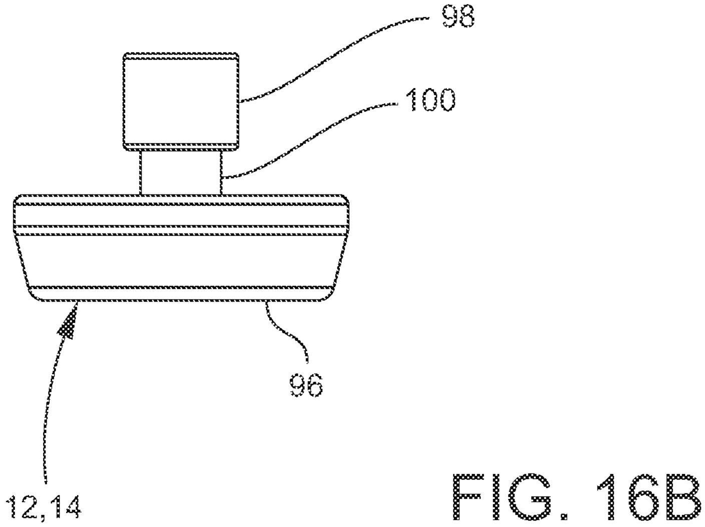
FIG. 16B is a top plan view of the first slider of the latch apparatus of FIG. 1, which first slider is identical to the second slider of the latch apparatus of FIG. 1.

FIG. 14B shows how the inner head 98 of independent latch or slider 14 may relate to its respective striker 116 and keeper 112 when the U-shaped swinging piece 76 is closed from an open position to a closed position. FIG. 14B shows the case where a user does not engage the outer head 96 of independent latch or slider 14 but simply lets U-shaped swinging piece 76 fall by itself under gravity back to the closed position. FIG. 14B shows multiple positions of the inner head 98 of independent latch or slider 14 where each of the multiple positions represents a snapshot at a different time during the swinging down of U-shaped swinging piece 76. Under the influence of gravity, the inner head 98 of independent latch or slider 14 will slide down or roll down or undergo a combination of a sliding and rolling upon its respective striker 116. Then, after the inner head 98 of independent latch or slider 14 clears junction 118, the inner head 98 of independent latch or slider 14 will space itself from the keeper 112 as the independent latch or slider 14 continues to slide down the slot 90. It should be noted that as soon as the user lets go of the U-shaped swinging piece 76 when the U-shaped swinging piece 76 is in an open position, independent latch or slider 14 will begin to slide down its respective slot 90 since at all times the distal slot end 102 is at a greater elevation than proximal slot end 104.

Thus since the invention disclosed herein may be embodied in other specific forms without departing from the spirit or general characteristics thereof, some of which forms have been indicated, the embodiments described herein are to be considered in all respects illustrative and not restrictive. The scope of the invention is to be indicated by the appended claims, rather than by the foregoing description, and all changes which come within the meaning and range of equivalents of the claims are intended to be embraced therein.

What is claimed is:

1. A method for engaging a gate to a first barrier section in a gated barrier, the gate and the first barrier section engagable to each other by a latch apparatus, the latch apparatus including a swinging piece, the swinging piece pivotally engaged to one of the gate and the first barrier section, the latch apparatus including a keeper, the keeper being on the other of the gate and the first barrier section, the swinging piece releasably engaged to the keeper, the swinging piece having an open position where the swinging piece is disengaged from the keeper to permit the gate to be swung open, the swinging piece having a closed position where the swinging piece is engaged to the keeper to keep the gate from being swung, one of the gate and the first barrier section including a support member, the swinging piece being swingably engaged to the support member, the support member including an extension having an upper oblique surface and a lower oblique surface, the upper and lower oblique surfaces forming a tip, the swinging piece having a slot and a slider slideable in the slot, the slider having a slider portion, wherein the method comprises the steps of:

a) swinging the gate to be aligned in a plane with the first barrier section;
b) letting the swinging piece fall by gravity such that the slider portion makes contact with the upper oblique surface of the extension;
c) letting the slider portion slide or roll down the upper oblique surface;
d) letting the slider portion clear the tip formed by the upper and lower oblique surfaces of the extension; and
e) letting the slider portion slide down the slot and adjacent to the lower oblique surface of the extension such that the swinging piece engages the keeper to engage the gate to the first barrier section.

2. A method for disengaging a gate from a first barrier section in a gated barrier, the gate and the first barrier section engagable to each other by a latch apparatus, the latch apparatus including a swinging piece, the swinging piece pivotally engaged to one of the gate and the first barrier section, the latch apparatus including a keeper, the keeper being on the other of the gate and the first barrier section, the swinging piece releasably engaged to the keeper, the swinging piece having an open position where the swinging piece is disengaged from the keeper to permit the gate to be swung open, the swinging piece having a closed position where the swinging piece is engaged to the keeper to keep the gate from being swung, one of the gate and the first barrier section including a support member, the swinging piece being swingably engaged to the support member, the support member including an extension having an upper oblique surface and a lower oblique surface, the upper and lower oblique surfaces forming a tip, the swinging piece having a slot and a slider slideable in the slot, the slider having a slider portion, wherein the method comprises the steps of:

a) sliding the slider portion upwardly in the slot and adjacent to the lower oblique surface of the extension;
b) continuing to slide the slider portion in the slot to a point beyond the tip; and then
c) lifting the swinging piece such that the swinging piece is disengaged from the keeper such that the gate may swing relative to the first barrier section.

* * * * *